(12) United States Patent
Ikeya

(10) Patent No.: US 11,867,897 B2
(45) Date of Patent: Jan. 9, 2024

(54) INSERTION ASSISTING INSTRUMENT AND EXTRACTION METHOD OF INSERTION PORTION OF ENDOSCOPE

(71) Applicant: Evident Corporation, Nagano (JP)

(72) Inventor: Motoshi Ikeya, Sagamihara (JP)

(73) Assignee: Evident Corporation, Nagano (JP)

( * ) Notice: Subject to any disclaimer, the term of this patent is extended or adjusted under 35 U.S.C. 154(b) by 408 days.

(21) Appl. No.: 17/368,030

(22) Filed: Jul. 6, 2021

(65) Prior Publication Data

US 2023/0011117 A1 Jan. 12, 2023

(51) Int. Cl.
G02B 23/24 (2006.01)

(52) U.S. Cl.
CPC ..... G02B 23/2492 (2013.01); G02B 23/2423 (2013.01); G02B 23/2453 (2013.01)

(58) Field of Classification Search
CPC ........................ G02B 23/2492; G02B 23/2423
USPC .................................................. 33/1 BB, 542
See application file for complete search history.

(56) References Cited

U.S. PATENT DOCUMENTS

| | | | | |
|---|---|---|---|---|
| 7,667,211 B2 * | 2/2010 | Takahashi | ................ | A61B 1/05 250/458.1 |
| 11,272,832 B2 * | 3/2022 | Yamaya | ................ | A61B 1/0014 |
| 11,606,497 B2 * | 3/2023 | Ratnakar | ................ | H04N 23/90 |
| 11,759,096 B2 * | 9/2023 | Morishima | ............... | A61B 1/05 600/112 |
| 2017/0245734 A1 * | 8/2017 | Kaneko | ................... | A61B 1/307 |
| 2019/0175002 A1 * | 6/2019 | Igarashi | ............. | A61B 1/00094 |
| 2020/0015667 A1 * | 1/2020 | Adachi | ............. | G02B 23/2423 |
| 2021/0015347 A1 * | 1/2021 | Titus | ................... | A61B 1/00148 |
| 2021/0093176 A1 * | 4/2021 | Kono | ................ | G02B 13/0085 |
| 2021/0228064 A1 * | 7/2021 | Sørensen | ............. | A61B 1/0008 |
| 2021/0382291 A1 * | 12/2021 | Hattori | ............... | G02B 23/2492 |

FOREIGN PATENT DOCUMENTS

| | | |
|---|---|---|
| JP | 2004-305765 A | 11/2004 |
| JP | 2017-068076 A | 4/2017 |

* cited by examiner

*Primary Examiner* — George B Bennett
(74) *Attorney, Agent, or Firm* — Scully, Scott, Murphy & Presser, P.C.

(57) ABSTRACT

An insertion assisting instrument has an outer diameter dimension set to satisfy a relationship of xb'<xc' assuming that an insertion assisting instrument is projected on X-Y coordinates such that a point on a circumference where the insertion assisting instrument has a largest outer diameter (that is, a point on an outer periphery of a proximal-end-side tapered surface at a distal end) is set as an origin and the proximal-end-side tapered surface is brought into contact with an X axis, coordinates of a second point B, which is most distal from the X axis on the circumference where the insertion assisting instrument has the largest outer diameter are (xb', yb'), and coordinates of a third point C, which is most proximal from the X axis on a circumference at the proximal end of the insertion assisting instrument, are (xc', yc').

11 Claims, 23 Drawing Sheets

INSERTION ASSISTING INSTRUMENT AND EXTRACTION METHOD OF INSERTION PORTION OF ENDOSCOPE

BACKGROUND OF THE INVENTION

1. Field of the Invention

The present invention relates to an insertion assisting instrument which is attached to a distal end portion of an insertion portion of an endoscope to be inserted into various narrow spaces, such as a pipe, and to an extraction method of an insertion portion of an endoscope.

2. Description of the Related Art

Conventionally, endoscopes have been widely used in the industrial field. Industrial endoscopes of this kind can be suitably used for inspection or the like of an inside of various narrow spaces, such as a conduit of a chemical plant.

A narrow space in which an industrial endoscope is used is often a combination of straight-pipe-shaped narrow spaces and bent narrow spaces. Further, a narrow space often includes a stepped portion at a boundary portion between a linear narrow space and a bent narrow space.

As an insertion assisting instrument which has preferred ease of insertion into such a narrow space having the bent narrow space, the stepped portion and the like, there is a known guide tube device for endoscope disclosed in Japanese Patent Application Laid-Open Publication No. 2017-68076, for example. The guide tube device for endoscope includes a first coil portion, a second coil portion, a distal end member, a screw, and an inclined portion, the second coil portion being provided at a position closer to a distal end than the first coil portion and having lower bending rigidity than the first coil portion, the distal end member being provided on a distal end portion of the second coil portion and having a cylindrical shape, the screw being provided on the distal end member and protruding in a radial direction of the distal end member, the inclined portion being provided on a distal end side of a cylindrical member.

SUMMARY OF THE INVENTION

One aspect of the present invention is directed to an insertion assisting instrument which has an outer peripheral surface including a proximal-end-side tapered surface with a diameter decreasing from a distal end side toward a proximal end side and a distal-end-side tapered surface with a diameter decreasing from a proximal end side toward a distal end side, the distal-end-side tapered surface being continuously provided on the distal end side of the proximal-end-side tapered surface, a distal end portion of an insertion portion of an endoscope being inserted through and fixed to the insertion assisting instrument, wherein assuming that the insertion assisting instrument is projected on X-Y coordinates such that a point on a circumference where the insertion assisting instrument has a largest outer diameter is set as an origin and the proximal-end-side tapered surface is brought into contact with an X axis, coordinates of a point which is most distal from the X axis on the circumference where the insertion assisting instrument has the largest outer diameter are (xb', yb'), and coordinates of a point which is most proximal from the X axis on a circumference at a proximal end of the insertion assisting instrument are (xc', yc'), the insertion assisting instrument has an outer dimension that satisfies a relationship of xb'<xc'.

Another aspect of the present invention is directed to an insertion assisting instrument which has an outer peripheral surface including a proximal-end-side tapered surface with a diameter decreasing from a distal end side toward a proximal end side and a distal-end-side tapered surface with a diameter decreasing from a proximal end side toward a distal end side, the distal-end-side tapered surface being continuously provided on the distal end side of the proximal-end-side tapered surface, a distal end portion of an insertion portion of an endoscope being inserted through and fixed to the insertion assisting instrument, wherein assuming that the insertion assisting instrument is projected on X-Y coordinates such that a point on a circumference where the insertion assisting instrument has a largest outer diameter is set as an origin and the proximal-end-side tapered surface is brought into contact with an X axis, coordinates of a point which is most distal from the X axis on a circumference at a distal end of the insertion assisting instrument are (xa', ya'), and coordinates of a point which is most distal from the X axis on the circumference where the insertion assisting instrument has the largest outer diameter are (xb', yb'), the insertion assisting instrument has an outer dimension that satisfies a relationship of ya'<yb'.

Still another aspect of the present invention is directed to an extraction method of an insertion portion of an endoscope from an inside of a conduit, an outer peripheral surface of the insertion portion of the endoscope being provided with the insertion assisting instrument, the insertion portion including a distal end portion, a bending portion, and a flexible portion, the distal end portion of the insertion portion being inserted through and fixed to the insertion assisting instrument, the method including: pulling the flexible portion from an outside of the conduit; and causing the bending portion to be bent inward in a curve direction of a curved portion in a case where the distal end portion reaches the curved portion of the conduit.

DETAILED DESCRIPTION OF THE PREFERRED EMBODIMENTS

Figure 1:
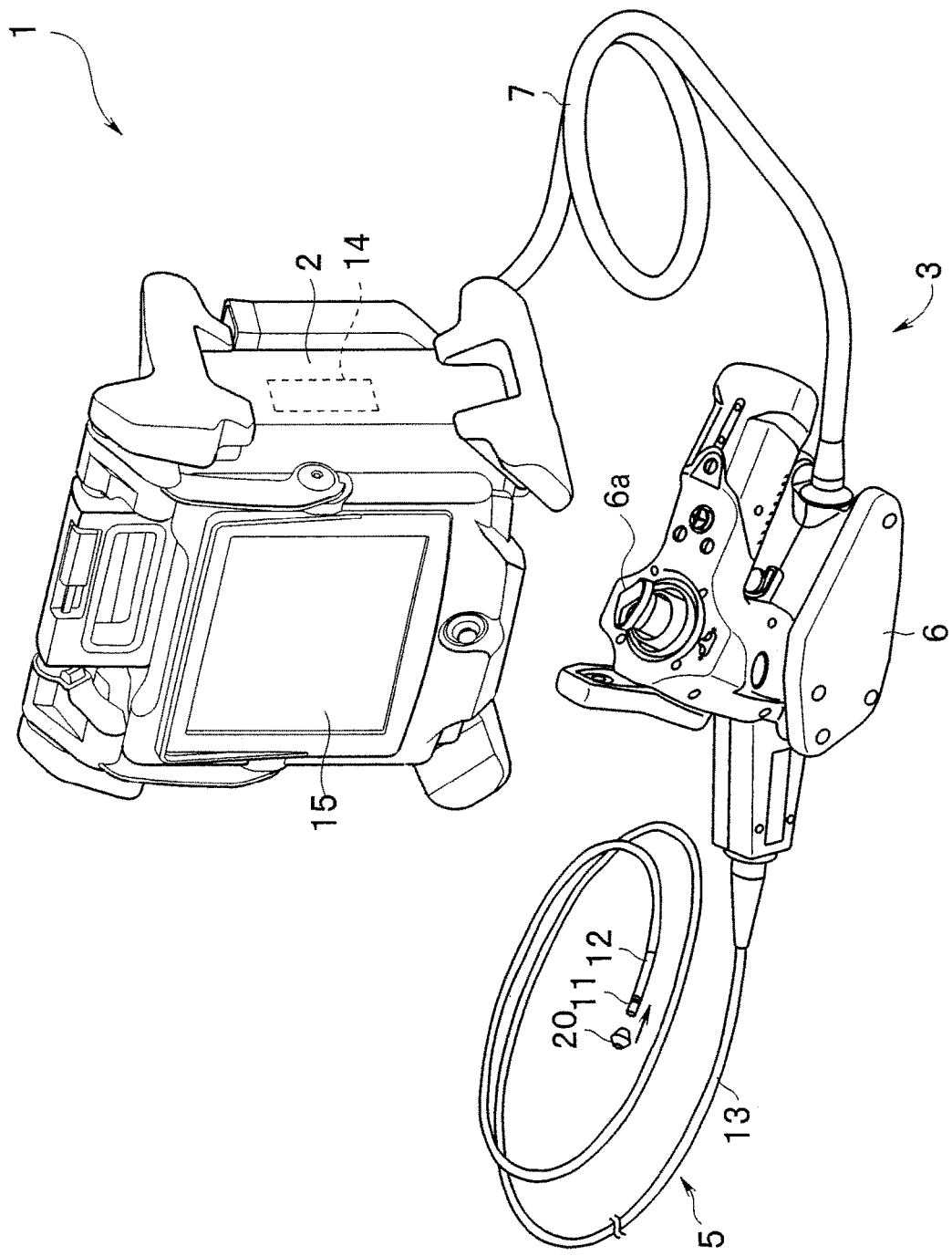
FIG. 1 is a configuration diagram according to a first embodiment of the present invention, and shows a configuration of an endoscope apparatus.

Hereinafter, a first embodiment of the present invention will be described with reference to FIG. 1 to FIG. 26. An endoscope apparatus 1 shown in FIG. 1 is an industrial endoscope apparatus suitable for inspection or the like of an inside of a subject having a narrow space, such as a conduit of a chemical plant. The endoscope apparatus 1 includes an endoscope 2 and a device body 3 connected to the endoscope 2.

The endoscope 2 includes an insertion portion 5, an operation portion 6, and a universal cord 7, the insertion portion 5 serving as an endoscope insertion portion which is to be inserted into a subject, the operation portion 6 being continuously provided on a proximal end of the insertion portion 5, the universal cord 7 extending from the operation portion 6. The endoscope 2 can be connected to the device body 3 via the universal cord.

The insertion portion 5 includes a distal end portion 11, a bending portion 12, and a long flexible portion 13 in that order from a distal end side of the insertion portion 5. The bending portion 12 is continuously provided on a proximal end of the distal end portion 11, and is bendable in vertical and horizontal directions, for example. The flexible portion 13 is continuously provided on a proximal end of the bending portion 12, and has flexibility.

Figure 25:
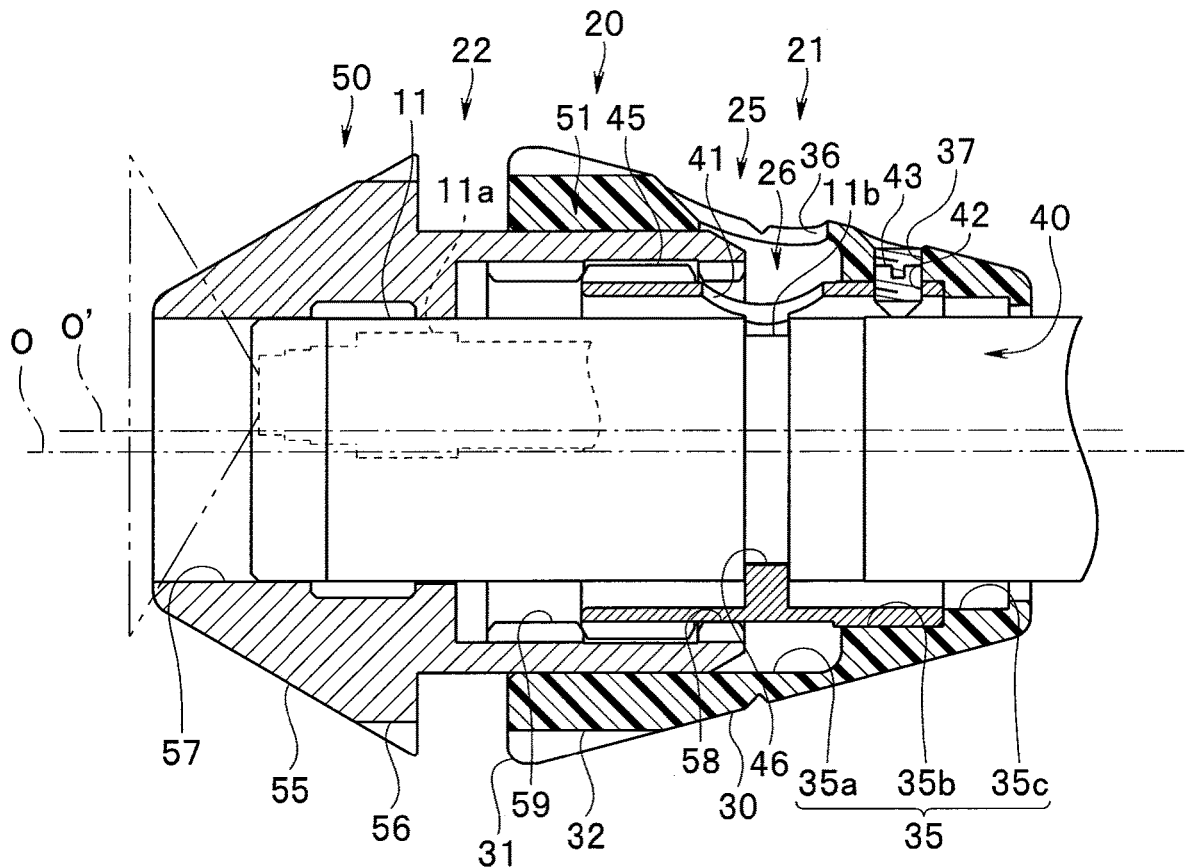
FIG. 25 is an explanatory diagram according to the first embodiment of the present invention, and shows a field of view of a picked-up image which is picked up in a state in which a fixing portion of the insertion assisting instrument is loosened.

An image pickup unit 11a is provided in the distal end portion 11 of the insertion portion 5, and a CMOS image sensor or the like is incorporated in the image pickup unit 11a (see FIG. 25). An image pickup device of the image pickup unit 11a receives incident light which is incident on an observation window (not shown in the drawing) provided in the distal end portion 11 of the insertion portion 5. In the description made hereinafter, vertical and horizontal directions of the distal end portion 11 and bending directions (vertical and horizontal directions) of the bending portion 12, for example, are defined by using vertical and horizontal directions set for the image pickup unit 11a (that is, vertical and horizontal directions of video picked up by the image pickup unit 11a) as a reference.

The operation portion 6 is provided with a bending joystick 6a that causes the bending portion 12 to be bent in the vertical and horizontal directions. A user can bend the bending portion 12 into a desired direction by performing a tilting operation of the bending joystick 6a. The operation portion 6 is also provided with, in addition to the bending joystick 6a, various operation buttons, such as a freeze button, a bending lock button, and a recording instruction button, as buttons that instruct functions of an endoscope.

The device body 3 includes a control unit 14 and a display unit 15, the control unit 14 performing image processing and various controls, the display unit 15 displaying various images generated by the image processing performed by the control unit 14.

The control unit 14 includes a well-known microcomputer and peripheral equipment of the microcomputer, the microcomputer including a CPU, a RAM, a ROM, a nonvolatile storage unit and the like. The control unit 14 has a function of generating an endoscope image by performing processing on a video signal transferred from the image pickup unit 11a of the endoscope 2. The control unit 14 also has a function of generating various images, such as an operation menu.

Whole or a part of the control unit 14 may be formed of a logic circuit, an analog circuit, or an electronic circuit, such as an FPGA.

The display unit 15 displays various images, such as endoscope images which are generated by the control unit 14. A touch panel may be provided on the display unit 15. When the touch panel is provided, the touch panel allows, for example, an operation of zooming in or an operation of zooming out on an endoscope image displayed on the display unit 15 or various input operations which are performed based on an image of the operation menu displayed on the display unit 15.

In such an endoscope apparatus 1, an insertion assisting instrument 20 can be removably mounted on the distal end portion 11 of the endoscope 2. Therefore, for example, as shown in FIG. 12 to FIG. 15, the insertion assisting instrument 20 of the present embodiment is applied to the distal end portion 11 of the endoscope 2, and a groove portion 11b is circumferentially formed on an outer periphery of the distal end portion 11 so as to fix the insertion assisting instrument 20.

The insertion assisting instrument 20 of the present embodiment is a member used for moving the distal end portion 11 to a position close to a center of a conduit 70 when an insertion portion 10 is inserted into the conduit 70, such as a pipe, which has an inner diameter sufficiently larger than an outer diameter of the insertion portion 10, for example (see FIG. 18 to FIG. 21).

Figure 2:
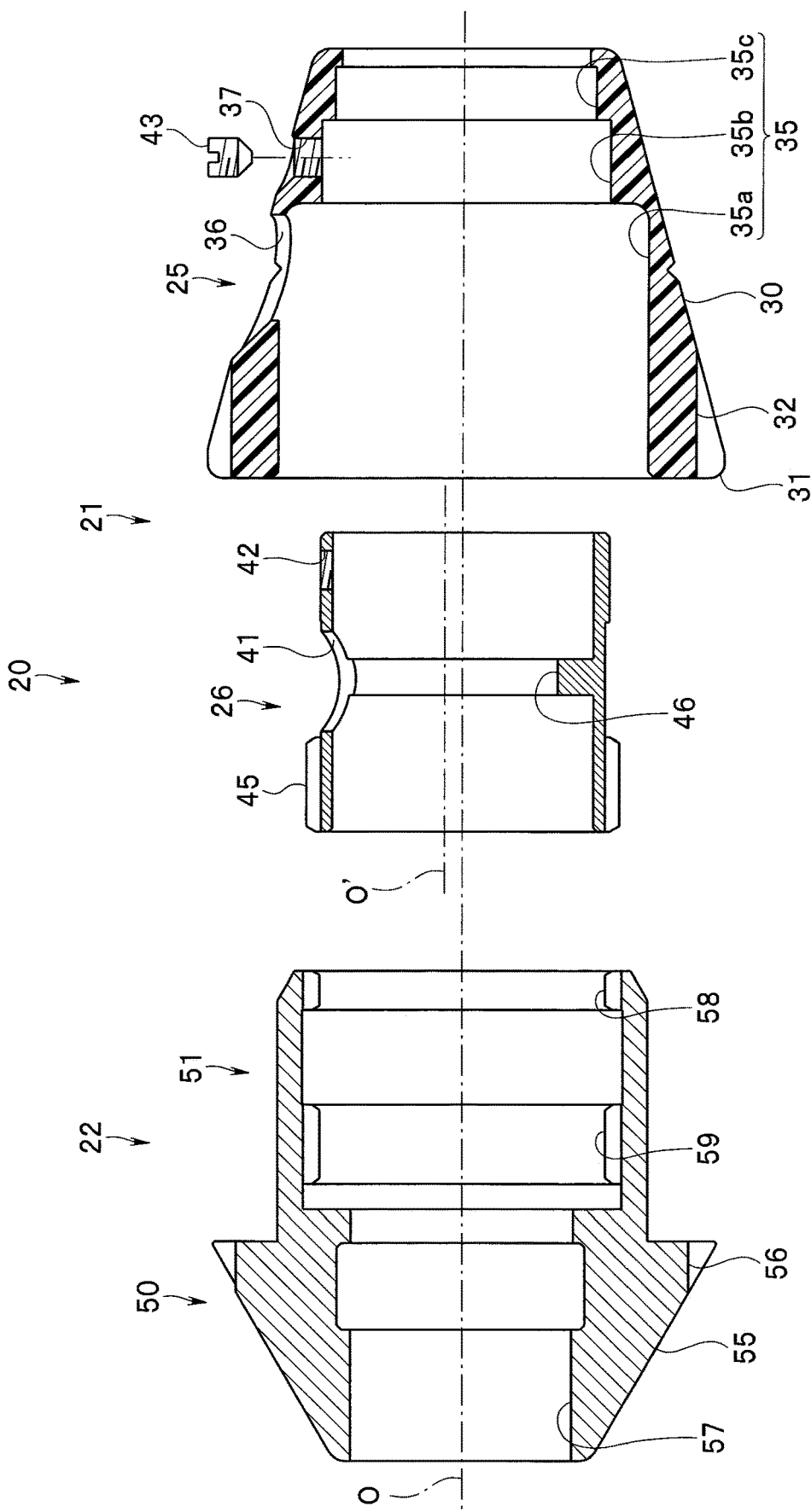
FIG. 2 is a cross-sectional view according to the first embodiment of the present invention, and shows an insertion assisting instrument in an exploded manner.
Figure 3:
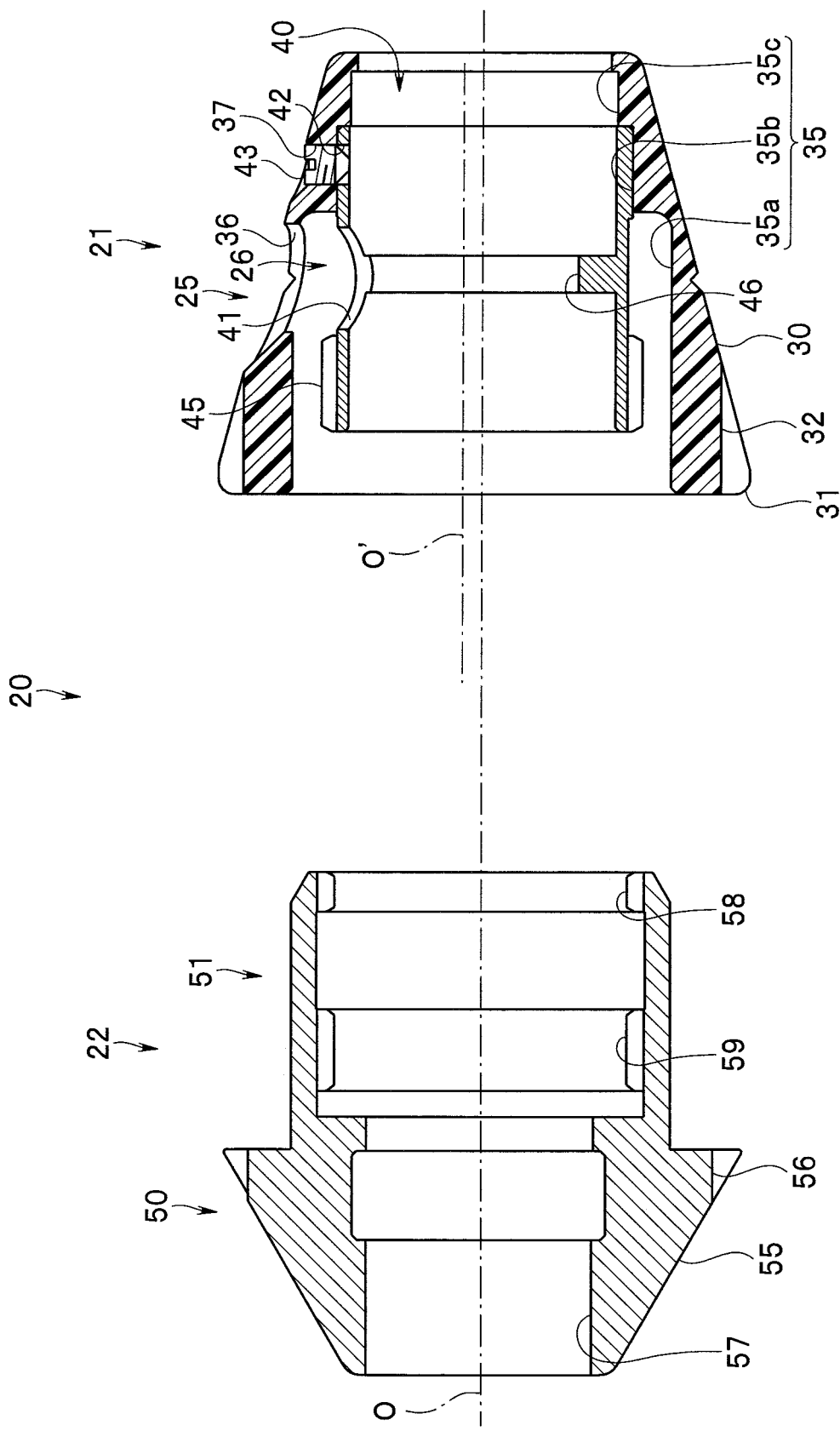
FIG. 3 is a cross-sectional view according to the first embodiment of the present invention, and shows an assisting instrument body and a head member in an exploded manner.

As shown in FIG. 2, the insertion assisting instrument 20 includes an assisting instrument body 21 and a cap member 22, the assisting instrument body 21 forming a proximal end side of the insertion assisting instrument 20, the cap member 22 being coupled to a distal end side of the assisting instrument body 21.

The assisting instrument body 21 has a double cylinder structure including an outer cylinder member 25 and an inner cylinder member 26. The outer cylinder member 25 is made of resin, and serves as a proximal-end-side member. The inner cylinder member 26 is made of metal, and is fixed to an inner portion of the outer cylinder member 25. In the present embodiment, for a resin material used for forming the outer cylinder member 25, a material is selected which is softer than a material used for forming the conduit 70 in which the insertion assisting instrument 20 is used.

The outer cylinder member 25 is formed of a member having a substantially truncated-cone-shaped external appearance.

In other words, an outer peripheral surface of the outer cylinder member 25 has a proximal-end-side tapered surface 30. The proximal-end-side tapered surface 30 is a tapered surface which has an outer diameter decreasing from a distal end side toward a proximal end side, and which is concentric with a center axis O of the insertion assisting instrument 20.

Further, a chamfered portion 31 is formed between the proximal-end-side tapered surface 30 and a distal end surface of the outer cylinder member 25. With the formation of the chamfered portion 31, a position where the outer cylinder member 25 has the largest outer diameter (that is, a distal end of the proximal-end-side tapered surface 30) is set at a position slightly biased more toward a proximal end side than a distal end of the outer cylinder member 25.

A plurality of notched grooves 32 are equidistantly formed on an outer periphery of the outer cylinder member 25 at positions close to the distal end side of the outer cylinder member 25. The plurality of notched grooves 32 extend parallel to the center axis O of the insertion assisting instrument 20.

A through hole 35 is formed in the outer cylinder member 25. The through hole 35 is a multistage through hole where a first hole portion 35a, a second hole portion 35b, and a third hole portion 35c are continuously provided in that order from the distal end side.

An inner diameter of the second hole portion 35b is set to be smaller than an inner diameter of the first hole portion 35a. An inner diameter of the third hole portion 35c is set to be smaller than the inner diameter of the second hole portion 35b, and to be sufficiently larger than an outer diameter of the distal end portion 11. In the present embodiment, all of the first to third hole portions 35a to 35c are hole portions which have no incline, and which are disposed concentrically with the center axis O of the insertion assisting instrument 20.

An observation hole 36 is formed in the outer cylinder member 25 at a position that corresponds to the first hole portion 35a. The observation hole 36 penetrates through the outer cylinder member 35 from an outer peripheral side to an inner peripheral side.

A screw hole 37 is also formed in the outer cylinder member 25 at a position that corresponds to the second hole portion 35b. The screw hole 37 penetrates through the outer cylinder member 25 from the outer peripheral side to the inner peripheral side.

The inner cylinder member 26 is formed of a member having a substantially cylindrical shape.

An outer diameter of the inner cylinder member 26 is set to be substantially equal to the inner diameter of the second hole portion 35b of the outer cylinder member 25. With such setting, a proximal end side of the inner cylinder member 26 can be fitted into the second hole portion 35b of the outer cylinder member 25. With such fitting, the inner cylinder member 26 is positioned concentrically with the center axis O of the insertion assisting instrument 20.

An inner diameter of the inner cylinder member 26 is set to be substantially equal to the inner diameter of the third hole portion 35c of the outer cylinder member 25. With such setting, when the inner cylinder member 26 is fitted into the outer cylinder member 25, the inner cylinder member 26 and the third hole portion 35c continuously form a distal end portion insertion hole 40 in the assisting instrument body 21 (see FIG. 3).

An observation hole 41 is also formed in the inner cylinder member 26 at a position that corresponds to the observation hole 36 of the outer cylinder member 25. The observation hole 41 penetrates through the inner cylinder member 26 from an outer peripheral side to an inner peripheral side.

A screw hole 42 is formed in the inner cylinder member 26 at a position that corresponds to the screw hole 37 of the outer cylinder member 25. The screw hole 42 penetrates through the inner cylinder member 26 from the outer peripheral side to the inner peripheral side. By causing a screw 43 to be threadedly engaged with the screw hole 37 of the outer cylinder member 25 and the screw hole 42 of the inner cylinder member 26, the inner cylinder member 26 is fixed to the outer cylinder member 25 (see FIG. 3).

A male threaded portion 45 is provided on an outer periphery of the inner cylinder member 26 at a position close to a distal end side. The male threaded portion 45 protrudes outward in a radial direction.

Further, a flange portion 46 is provided on an inner periphery of an intermediate portion of the inner cylinder member 26. The flange portion 46 has a partial arc shape which can engage with the groove portion 11b of the distal end portion 11. For example, a center axis O' of the flange portion 46 is set at a position biased toward the observation hole 41 with respect to the center axis O. An inner diameter of the flange portion 46 is set to be substantially equal to the outer diameter of the distal end portion 11.

The cap member 22 includes a cap portion 50 and a cylinder portion 51, the cap portion 50 serving as a distal end side member which forms a distal end side of the insertion assisting instrument 20, the cylinder portion 51 extending from a proximal end of the cap portion 50. These the cap portion 50 and the cylinder portion 51 are formed as an integral body by a metal member, for example.

The cap portion 50 is formed to have a substantially truncated-cone-shaped external appearance.

In other words, an outer peripheral surface of the cap portion 50 has a distal-end-side tapered surface 55. The distal-end-side tapered surface 55 is a tapered surface which has an outer diameter decreasing from a proximal end side toward a distal end side, and which is concentric with the center axis O of the insertion assisting instrument 20.

An outer diameter of the cap portion 50 at a proximal end (a proximal end of the distal-end-side tapered surface 55) is set to be substantially equal to a diameter of the distal end surface of the outer cylinder member 25. In other words, the outer diameter of the distal-end-side tapered surface 55 at the proximal end is set to be substantially equal to the diameter of the distal end surface of the outer cylinder member 25, which is set to be smaller than the outer diameter of the proximal-end-side tapered surface 30 at the distal end due to the chamfered portion 31 being interposed.

Further, a plurality of notched grooves 56 are formed on an outer periphery of the cap portion 50 at positions close to a proximal end side of the cap portion 50. The notched grooves 56 extend parallel to the center axis O of the insertion assisting instrument 20, and are formed at equidistant positions that correspond to the notched grooves 32 of the outer cylinder member 25.

A distal end portion holding hole 57 is formed in the cap portion 50. The distal end portion holding hole 57 communicates with an inside of the cylinder portion 51. An inner diameter of the distal end portion holding hole 57 is set to be substantially equal to the outer diameter of the distal end portion 11. With such setting, the distal end portion 11 can be fitted into the distal end portion holding hole 57.

The cylinder portion 51 is disposed on the proximal end side of the cap portion 50 such that the cylinder portion 51 is coaxial with the center axis O of the insertion assisting instrument 20.

An outer diameter of the cylinder portion 51 is set to be substantially equal to the inner diameter of the first hole portion 35a of the outer cylinder member 25. An inner diameter of the cylinder portion 51 is set to be larger than an outer diameter of the male threaded portion 45 provided on the inner cylinder member 26.

A first female threaded portion 58 is provided on an inner portion of the cylinder portion 51 at a position close to a proximal end side. The first female threaded portion 58 can be threadedly engaged with the male threaded portion 45 of the inner cylinder member 26. A second female threaded portion 59 is also provided on the inner portion of the cylinder portion 51 at a position close to a distal end side. The second female threaded portion 59 can be threadedly engaged with the male threaded portion 45 of the inner cylinder member 26. It is desirable that a distance between the first female threaded portion 58 and the second female threaded portion 59 be set to be at least larger than a width of the male threaded portion 45.

By causing the second female threaded portion 59 provided on the cylinder portion 51 to be threadedly engaged with the male threaded portion 45 of the inner cylinder member 26, the cap member 22 having such a configuration is coupled to the assisting instrument body 21. With such coupling, the insertion assisting instrument 20 is formed which has the distal-end-side tapered surface 55 and the proximal-end-side tapered surface 30 at an outer peripheral portion (see FIG. 4 to FIG. 11). The chamfered portion 31 is interposed between the distal-end-side tapered surface 55 and the proximal-end-side tapered surface 30 and hence, a mating surface between the assisting instrument body 21 and the cap member 22 is located at a position slightly closer to the distal end side than the position where the insertion assisting instrument 20 has the largest outer diameter.

Next, procedure for assembling the insertion assisting instrument 20 to the distal end portion 11 of the insertion portion 5 of the endoscope 2 will be described with reference to FIG. 12 to FIG. 15.

In assembling the insertion assisting instrument 20 to the distal end portion 11, first, the assisting instrument body 21 in a state of being separated from the cap member 22 (the assisting instrument body 21 formed by fixing the inner cylinder member 26 to the outer cylinder member 25 by the screw 43) is assembled to the distal end portion 11.

Figure 4:
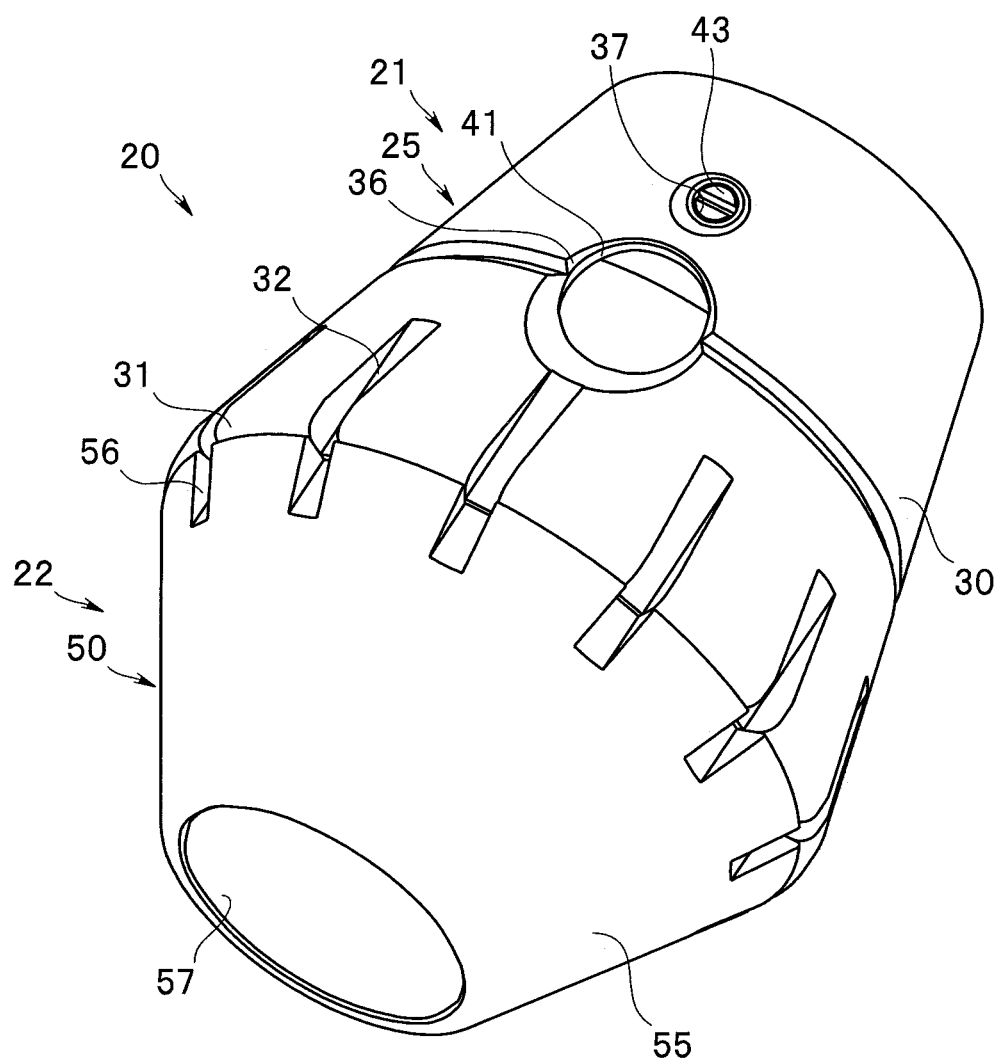
FIG. 4 is a perspective view according to the first embodiment of the present invention, and shows the insertion assisting instrument as viewed from obliquely above and in front.

In other words, for example, as shown in FIG. 4, a user causes the distal end portion 11 to be inserted through the distal end portion insertion hole 40 while causing a center axis of the distal end portion 11 to be aligned with the center axis O' of the flange portion 46 to avoid interference with the flange portion 46. At this point of operation, the distal end portion 11, which is inserted through the distal end portion insertion hole 40, is positioned at a position where the groove portion 11b matches the flange portion 46. The positioning is performed by the user such that the user observes an inside of an inner cylinder member 45 through the observation holes 36, 41, for example.

Figure 5:
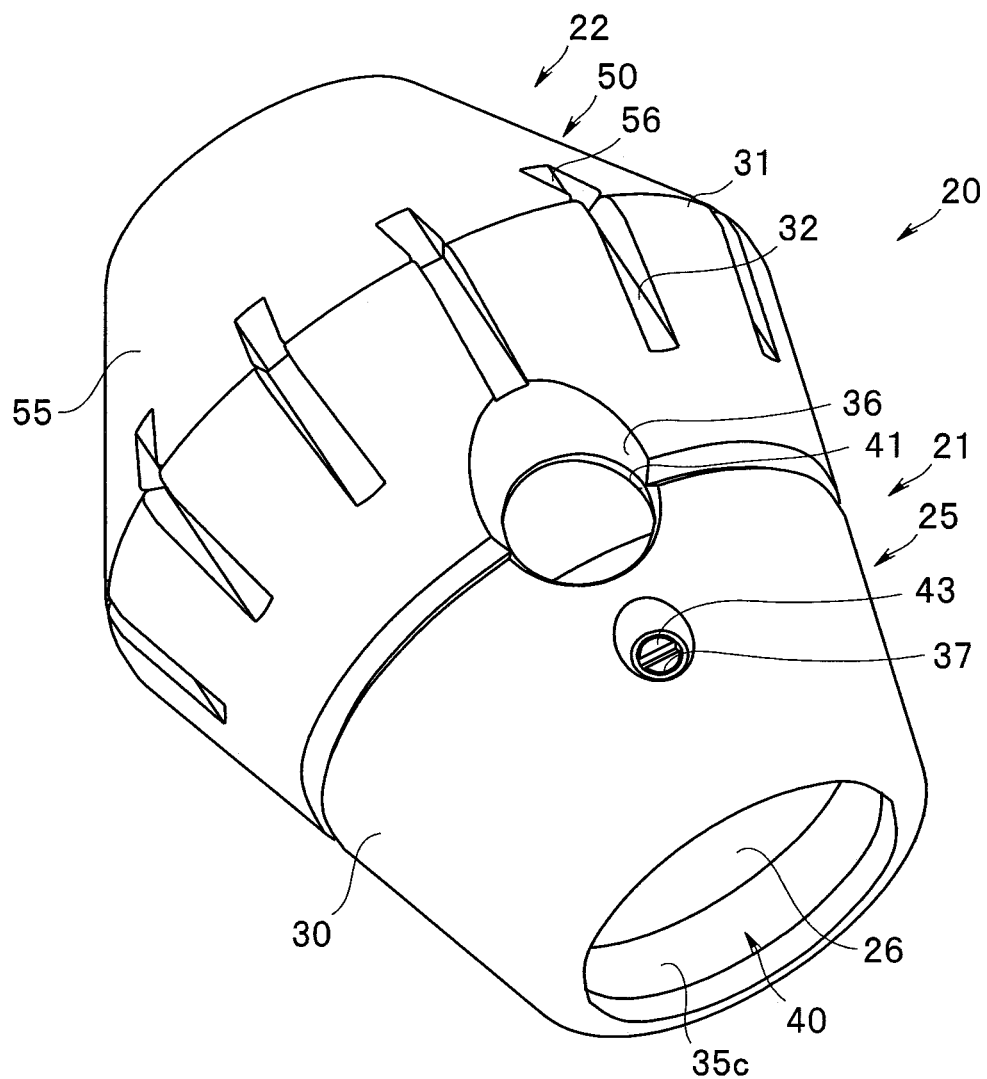
FIG. 5 is a perspective view according to the first embodiment of the present invention, and shows the insertion assisting instrument as viewed from obliquely above and behind.
Figure 6:
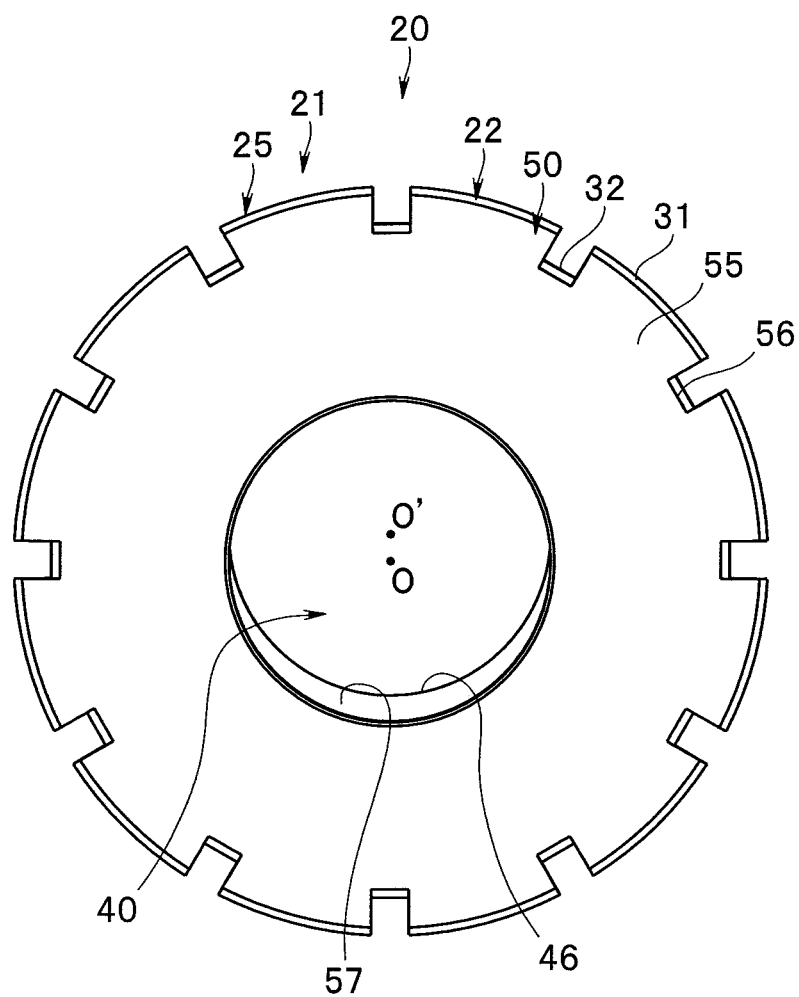
FIG. 6 is a front view according to the first embodiment of the present invention, and shows the insertion assisting instrument.
Figure 7:
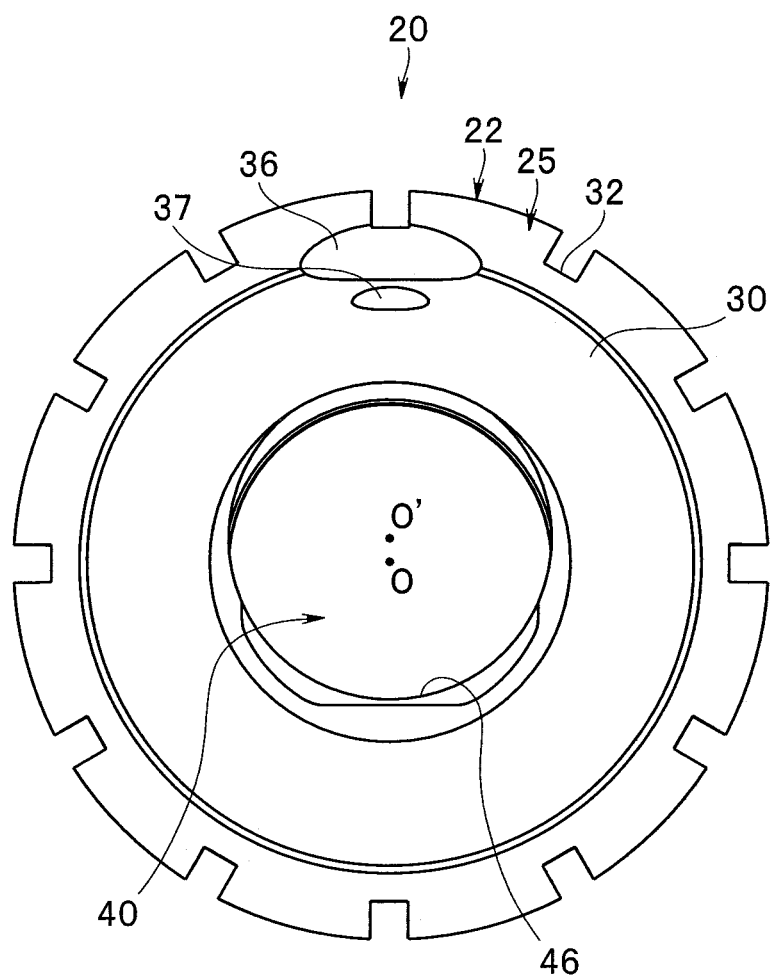
FIG. 7 is a back view according to the first embodiment of the present invention, and shows the insertion assisting instrument.
Figure 8:
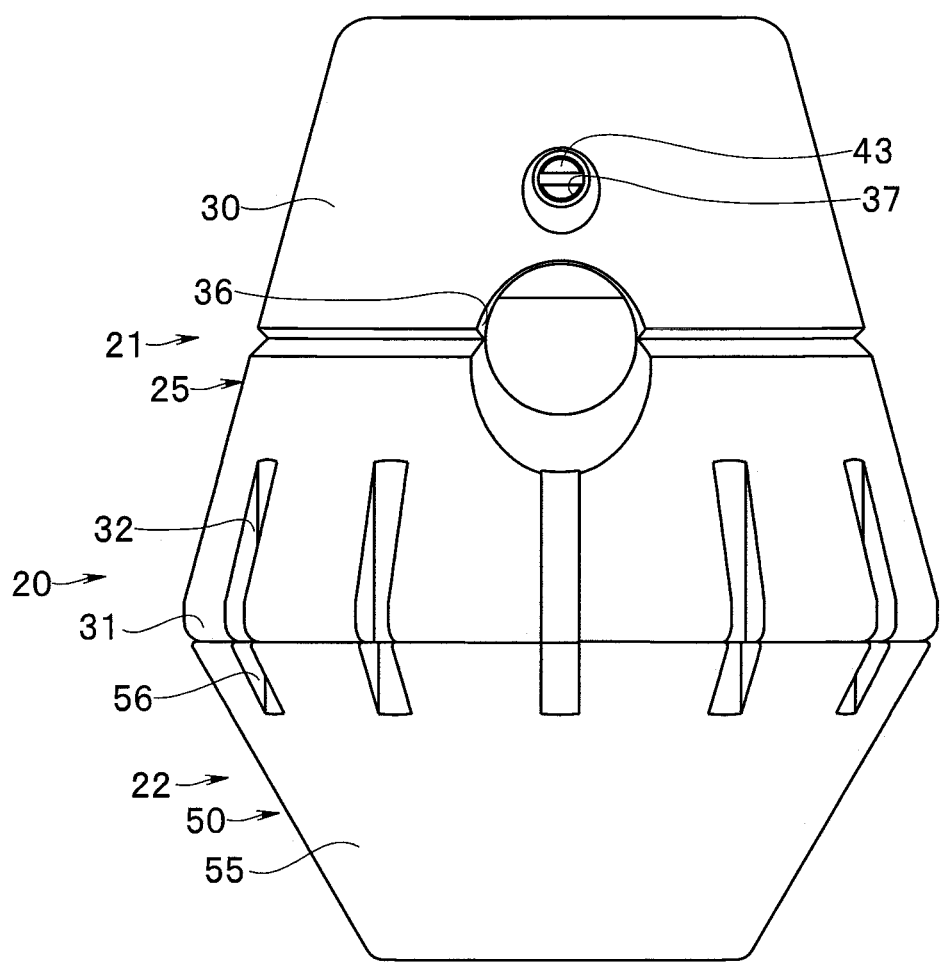
FIG. 8 is a plan view according to the first embodiment of the present invention, and shows the insertion assisting instrument.
Figure 9:
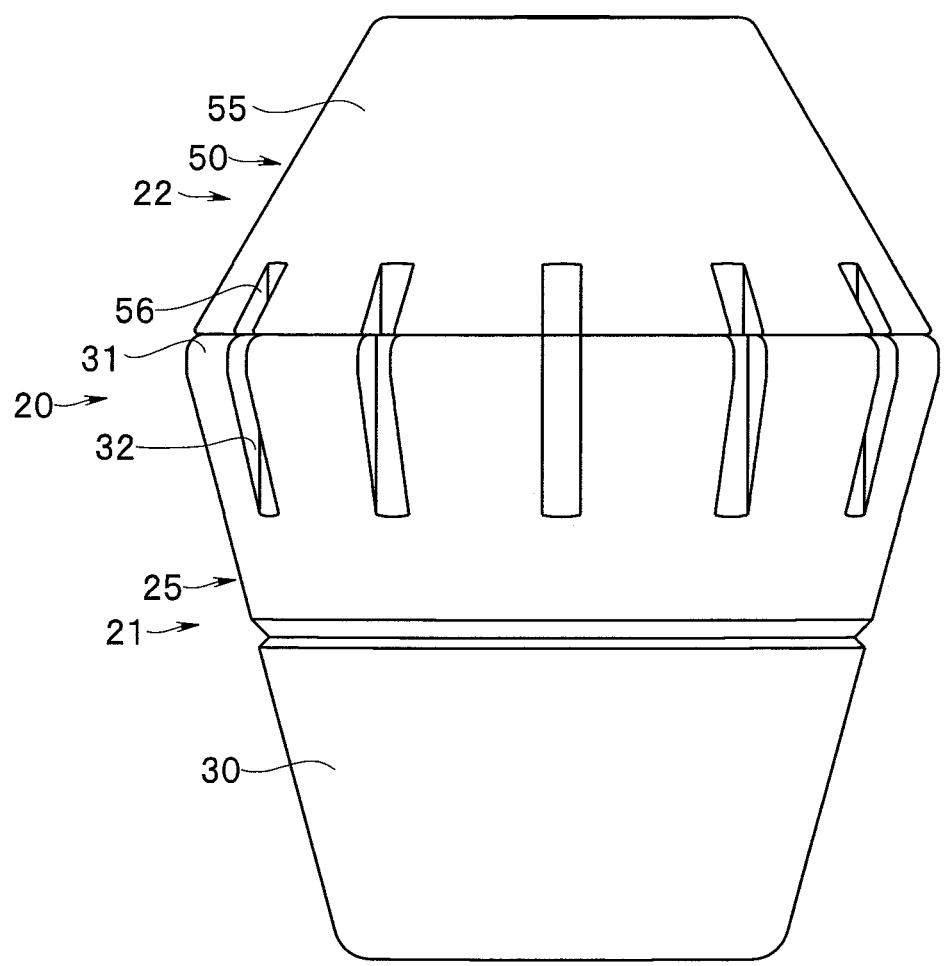
FIG. 9 is a bottom view according to the first embodiment of the present invention, and shows the insertion assisting instrument.
Figure 10:
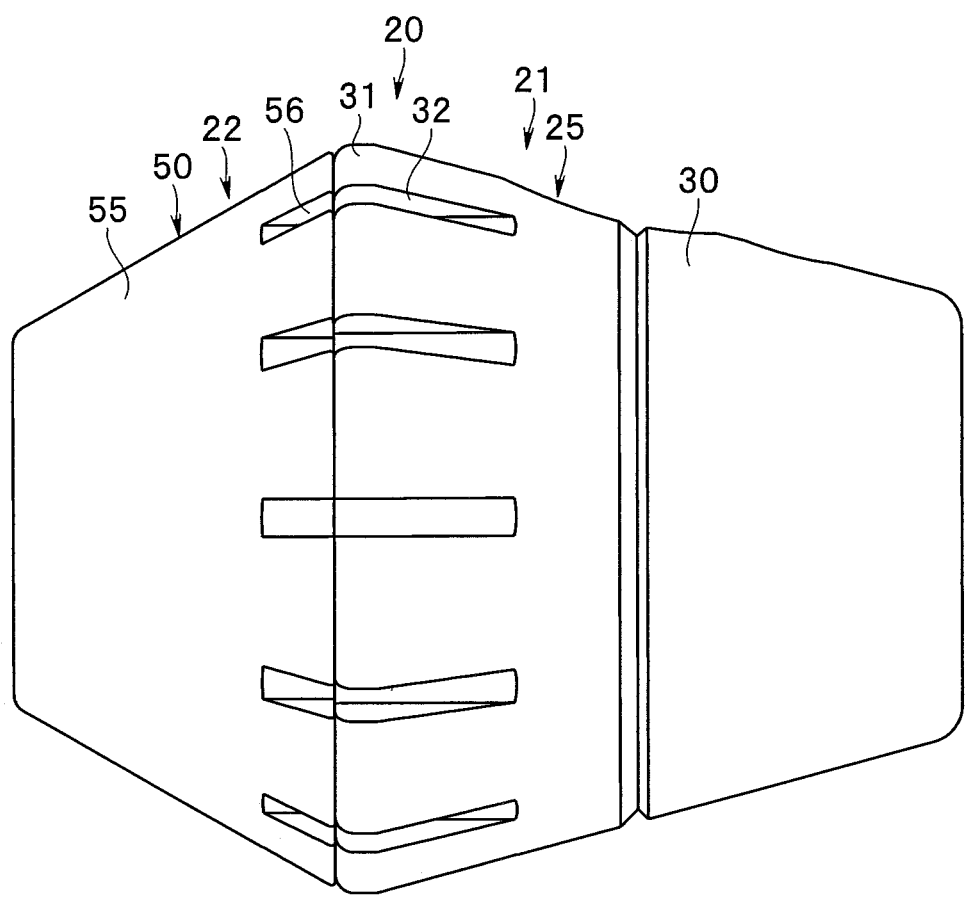
FIG. 10 is a right side view according to the first embodiment of the present invention, and shows the insertion assisting instrument.
Figure 11:
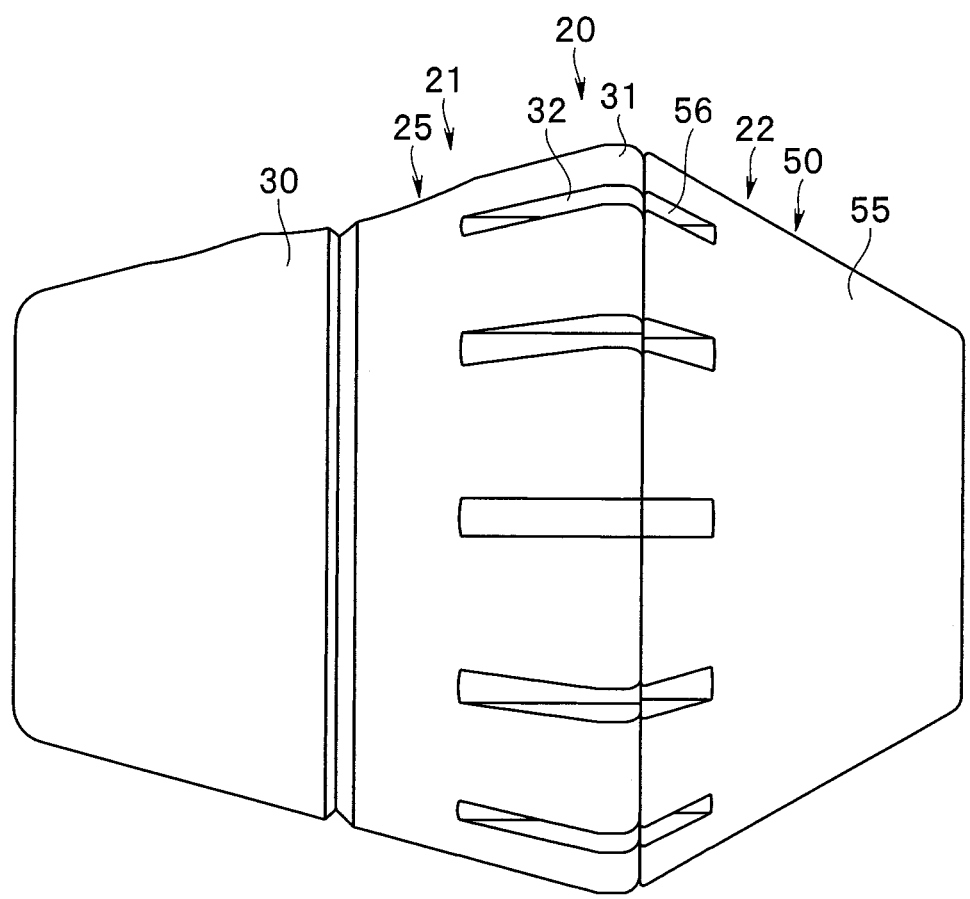
FIG. 11 is a left side view according to the first embodiment of the present invention, and shows the insertion assisting instrument.
Figure 12:
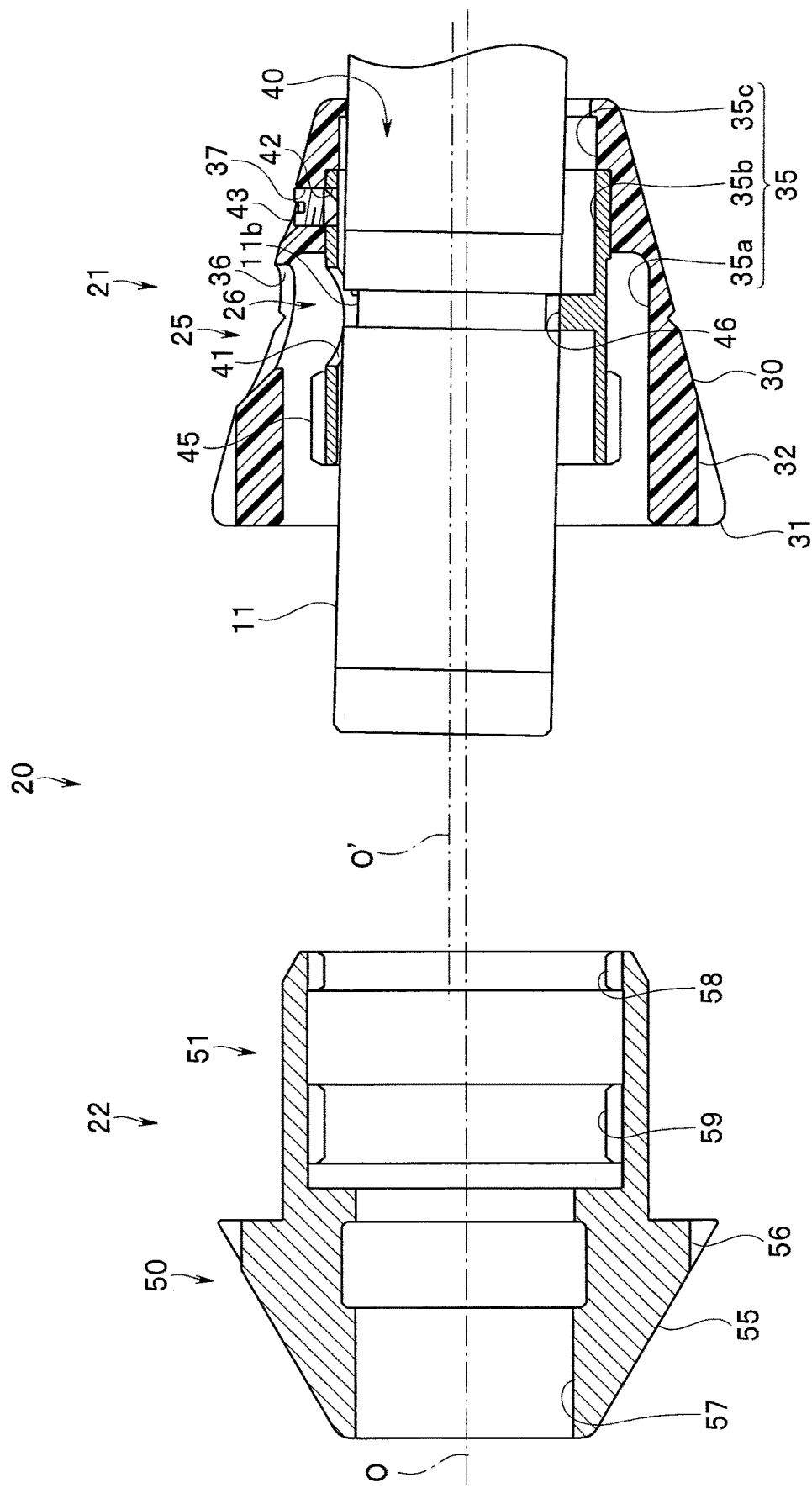
FIG. 12 is a cross-sectional view according to the first embodiment of the present invention, and shows the insertion assisting instrument at the time of being assembled to a distal end portion of an endoscope.
Figure 13:
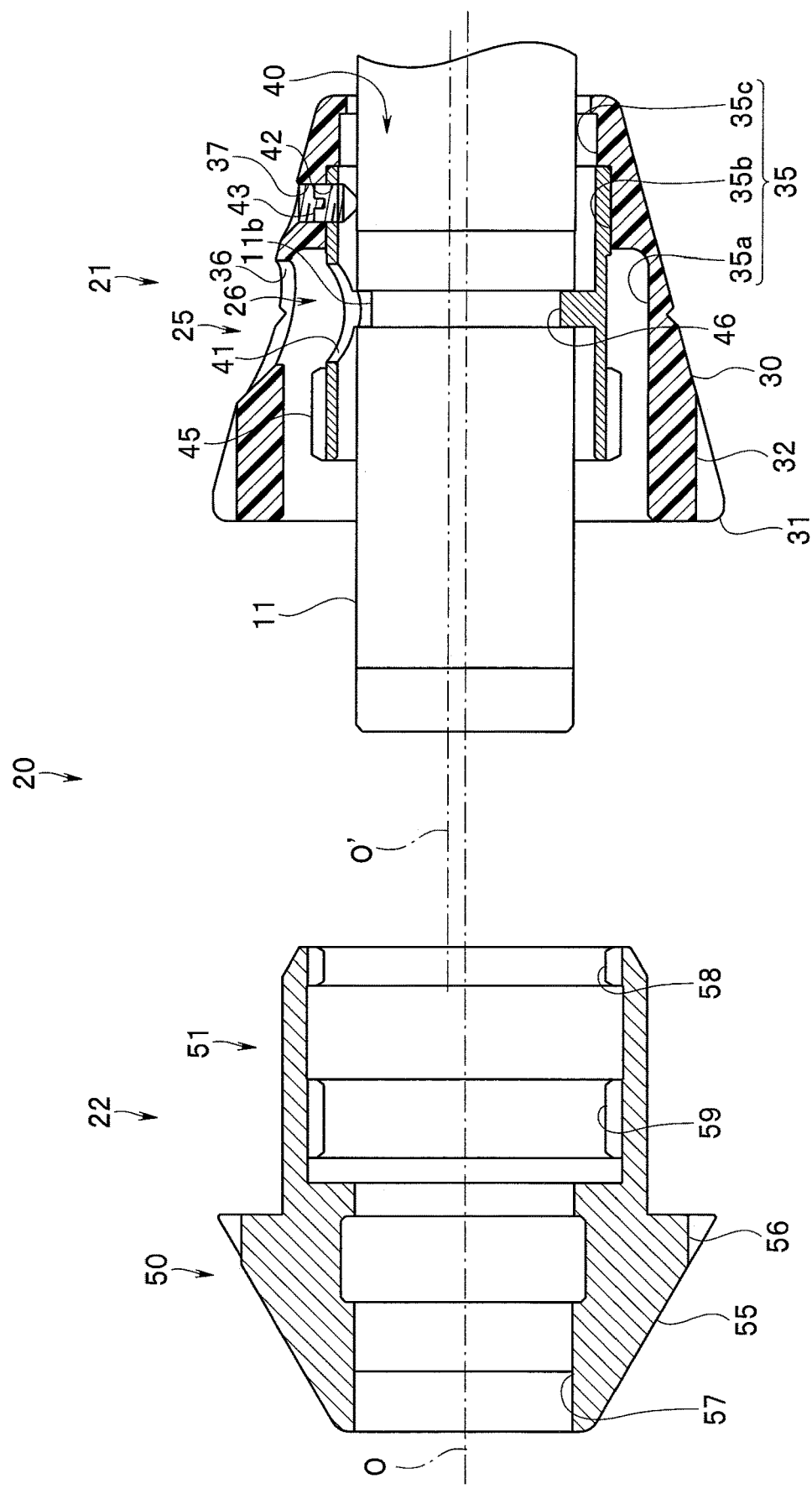
FIG. 13 is a cross-sectional view according to the first embodiment of the present invention, and shows the insertion assisting instrument at the time of being assembled to the distal end portion of the endoscope.
Figure 14:
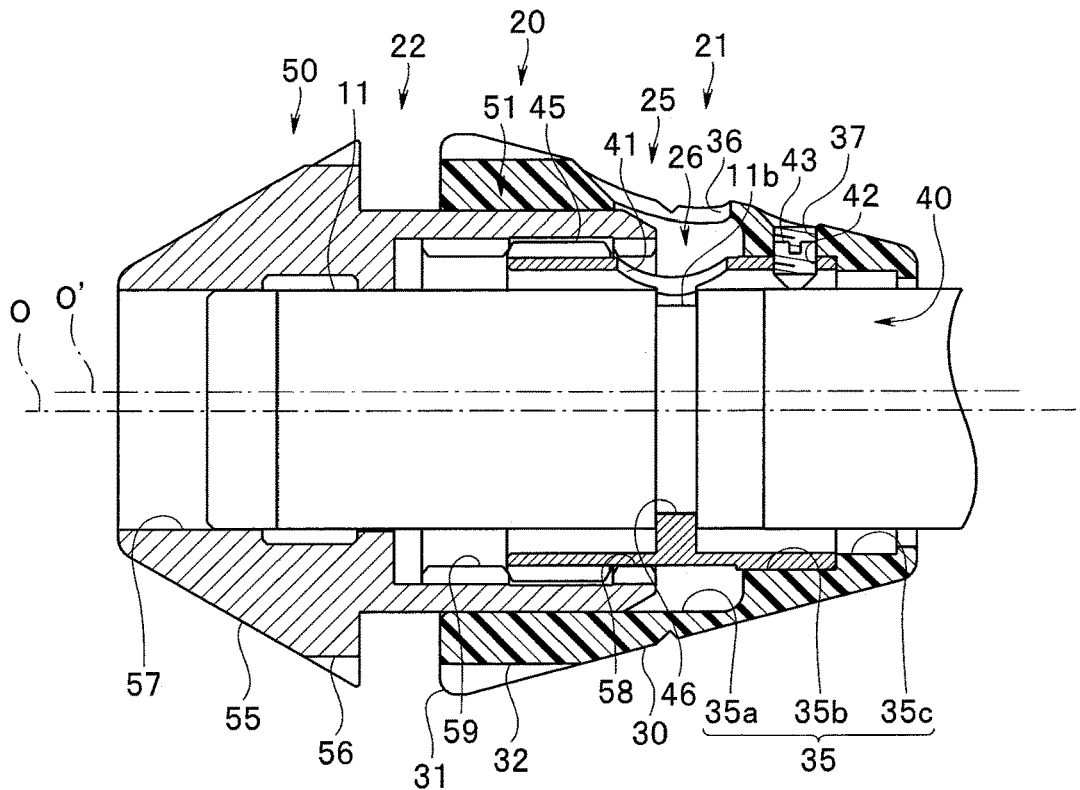
FIG. 14 is a cross-sectional view according to the first embodiment of the present invention, and shows the insertion assisting instrument at the time of being assembled to the distal end portion of the endoscope.
Figure 15:
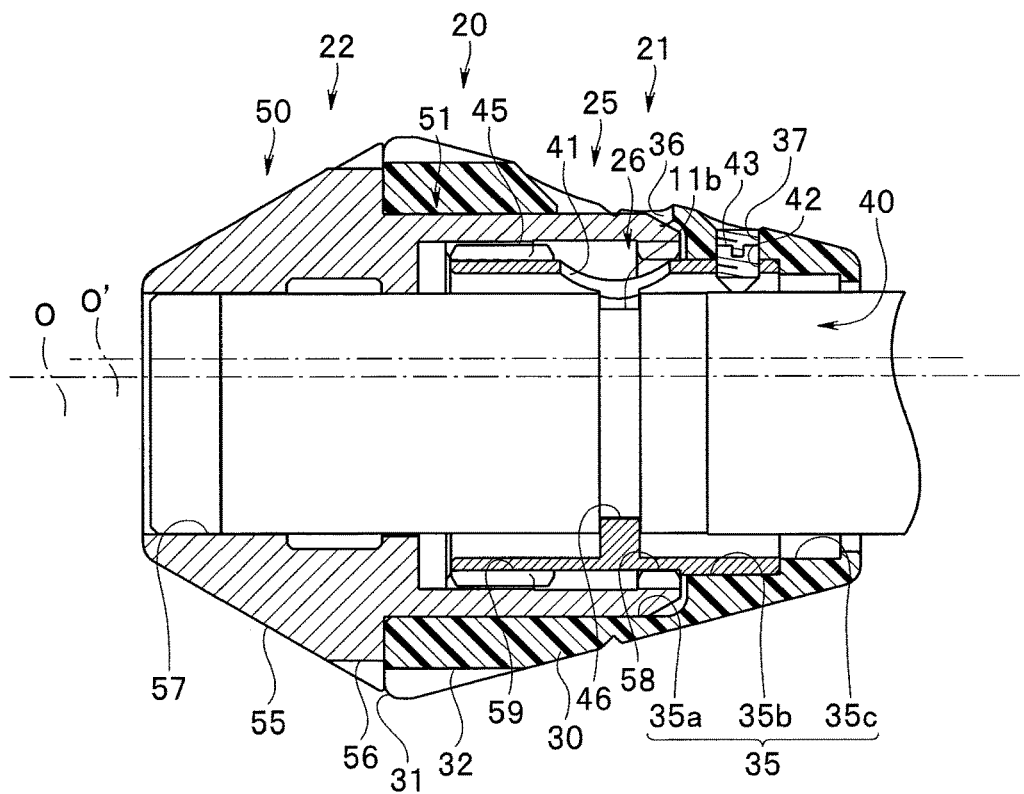
FIG. 15 is a cross-sectional view according to the first embodiment of the present invention, and shows the insertion assisting instrument assembled to the distal end portion of the endoscope.

Next, as shown in FIG. 5, for example, the user moves the distal end portion 11 from the center axis O' toward the center axis O. In other words, the user moves the distal end portion 11, where the groove portion 11b is positioned at the flange portion 46, in a direction perpendicular to the center axis O'. With such movement, the flange portion 46 of the inner cylinder member 26 is caused to engage with the groove portion 11b of the distal end portion 11.

Next, the user causes the screw 43, which is threadedly engaged with the screw holes 37, 42, to be screwed up to a position where a distal end of the screw 43 is brought into contact with an outer peripheral surface of the distal end portion 11. With such an operation, the distal end portion 11 is pushed by the screw 43 up to a position where a center of the distal end portion 11 is aligned with the center axis O of the assisting instrument body 21, so that the assisting instrument body 21 is fixed to the distal end portion 11. The assisting instrument body 21 may be fixed to the distal end portion 11 by a method where a threaded portion is provided on each of the outer periphery of the distal end portion 11 and an inner periphery of the assisting instrument body 21, and these threaded portions are threadedly engaged with each other.

Next, the user causes the cylinder portion 51 of the cap member 22 to enter a gap formed between the outer cylinder member 25 and the inner cylinder member 26 while causing the first female threaded portion 58 to be threadedly engaged with the male threaded portion 45. Further, the user advances thread engagement of the first female threaded portion 58 with the male threaded portion 45 to cause the first female threaded portion 58, which is threadedly engaged with the male threaded portion 45, to be removed from the male threaded portion 45 at a position closer to the proximal end side than the male threaded portion 45. With such a configuration, the first female threaded portion 58 serves as a stopper which can be locked to the male threaded portion 45, and the cap member 22 can be temporarily fixed to the assisting instrument body 21 (see FIG. 14).

Next, the user causes the second female threaded portion 59 to be threadedly engaged with the male threaded portion 45. The thread engagement is performed up to a position where a proximal end surface of the cap portion 50 is brought into contact with the distal end surface of the outer cylinder member 25. With such thread engagement, the cap member 22 is assembled to the distal end portion 11 in an integral state with the assisting instrument body 21 (see FIG. 15). At this point of operation, the male threaded portion 45 and the second female threaded portion 59 are threadedly engaged in a state in which the distal end portion 11 is inserted into the distal end portion holding hole 57 disposed coaxially with the center axis O of the assisting instrument body 21. Therefore, as the thread engagement between the male threaded portion 45 and the second female threaded portion 59 advances, a position of the distal end portion 11 converges at a position where the center of the distal end portion 11 is aligned with the center axis O of the assisting instrument body 21. In other words, the distal end portion 11 is positioned at a position, where the center of the distal end portion 11 is aligned with the center axis O of the assisting instrument body 21, not only by the screw 43 but also by the cap member 22. In a case where the distal end portion 11 can be sufficiently positioned with respect to the center axis O only by assembling the cap member 22 to the assisting instrument body 21, positioning of the distal end portion 11 with the screw 43 may be omitted.

Next, a preferred outer shape of the insertion assisting instrument 20 will be described with reference to FIGS. 16 and 17.

Figure 16:
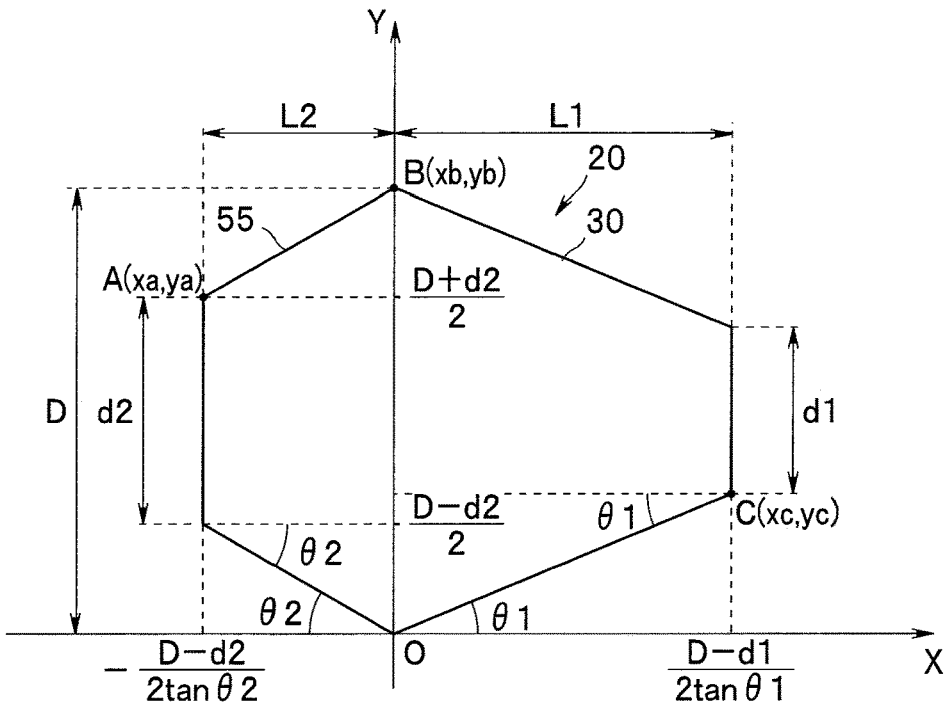
FIG. 16 is an explanatory diagram according to the first embodiment of the present invention, and shows a projection shape of the insertion assisting instrument on two-dimensional coordinates with a direction parallel to a center axis of the insertion assisting instrument being set as an X axis and with a direction perpendicular to the center axis of the insertion assisting instrument being set as a Y axis.

FIG. 16 is a diagram showing the insertion assisting instrument 20 on two-dimensional coordinates, the insertion assisting instrument 20 being disposed such that the center axis O is parallel to a wall surface or the like of a conduit in a state in which an outer peripheral portion of the insertion assisting instrument 20 having the largest diameter (in the present embodiment, an outer peripheral portion of the proximal-end-side tapered surface 30 at the distal end) is brought into contact with the wall surface or the like of the linear conduit, for example.

In other words, FIG. 16 is a diagram where the insertion assisting instrument 20 is projected on the two-dimensional coordinates with a direction parallel to a center axis of the insertion assisting instrument 20 being set as an X axis and with a direction perpendicular to the center axis of the insertion assisting instrument 20 being set as a Y axis. In the X-Y coordinate system, for example, the outer periphery of the proximal-end-side tapered surface 30 at the distal end is brought into contact with the wall surface of the conduit or the like, and a point on the outer periphery is set as an origin.

In the X-Y coordinate system, coordinates of a first point A to a third point C on the insertion assisting instrument 20 shown in FIG. 16 are as follows. In calculating the coordinates of the first point A to the third point C, an outer diameter of the insertion assisting instrument 20 at the proximal end (that is, the proximal end of the proximal-end-side tapered surface 30) is assumed as "d1", an outer diameter of the insertion assisting instrument 20 at a position where the insertion assisting instrument 20 has the largest outer diameter (that is, the distal end of the proximal-end-side tapered surface 30) is assumed as "D", an outer diameter of the insertion assisting instrument 20 at the distal end (that is, the distal end of the distal-end-side tapered surface 55) is assumed as "d2", a taper angle of the proximal-end-side tapered surface 30 is assumed as "θ1", and a taper angle of the distal-end-side tapered surface 55 is assumed as "θ2".

The first point A is a point which is most distal from the wall surface (that is, the X axis) at a distal end of the insertion assisting instrument 20 (that is, the outer peripheral surface of the distal-end-side tapered surface 55 at the distal end). The coordinates (xa, ya) of the first point A are $(-(D-d2)/(2 \tan θ2), (D+d2)/2)$.

A second point B is a point which is most distal from the wall surface (that is, the X axis) at the position where the insertion assisting instrument 20 has the largest outer diameter (that is, the outer peripheral surface of the proximal-end-side tapered surface 30 at the distal end). The coordinates (xb, yb) of the second point B are (0, D).

The third point C (xc, yc) is a point which is most proximal from the wall surface (that is, the X axis) at the proximal end of the insertion assisting instrument 20 (that is, the outer peripheral surface of the proximal-end-side tapered surface 30 at the proximal end). The coordinates (xc, yc) of the third point C are $((D-d1)/(2 \tan θ1))$.

Figure 17:
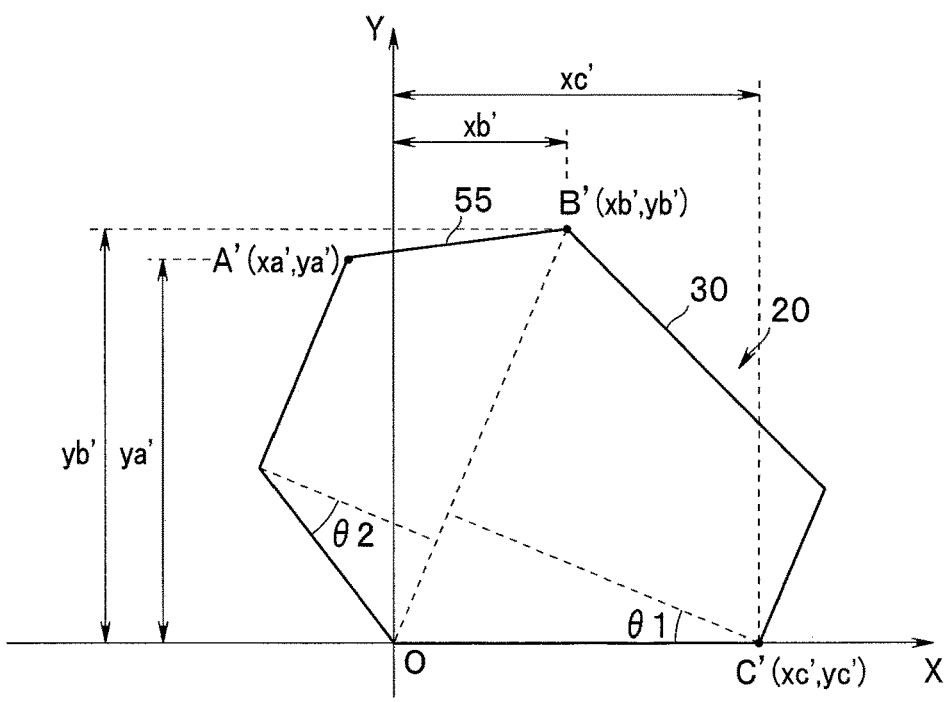
FIG. 17 is an explanatory diagram according to the first embodiment of the present invention, and shows a projection drawing of the insertion assisting instrument shown in FIG. 16 in a state of being rotated by a first taper angle.

As shown in FIG. 17, when the insertion assisting instrument 20 shown in FIG. 16 is rotated by the angle θ1 by using an origin O as a center, the proximal-end-side tapered surface 30 of the insertion assisting instrument 20 comes into contact with the wall surface (that is, the X axis). In such a state after the rotation, coordinates (xa', ya') of the first point A, coordinates (xb', yb') of the second point B, and coordinates (xc', yc') of the third point C can be calculated by the following formula (1).

$$\begin{bmatrix} xa' & xb' & xc' \\ ya' & yb' & yc' \end{bmatrix} = \begin{bmatrix} \cos\theta 1 & -\sin\theta 1 \\ \sin\theta 1 & \cos\theta 1 \end{bmatrix} \times \begin{bmatrix} -\dfrac{D-d2}{2\tan\theta 2} & 0 & \dfrac{D-d1}{2\tan\theta 1} \\ \dfrac{D+d2}{2} & D & \dfrac{D-d1}{2} \end{bmatrix} \quad (1)$$

Respective dimensions of the insertion assisting instrument 20 are set to satisfy the following first condition or second condition in a state in which the insertion assisting instrument 20 is tilted such that the proximal-end-side tapered surface 30 is brought into contact with the wall surface as described above.

First condition: the respective dimensions of the insertion assisting instrument 20 are set to satisfy a relationship of xb'<xc'. More preferably, to prevent the center axis O of the insertion assisting instrument 20 from being excessively inclined with respect to the wall surface when the proximal-end-side tapered surface 30 is brought into contact with the wall surface, the respective dimensions of the insertion assisting instrument 20 are set to satisfy relationship of 15°≤θ1≤30°.

Second condition: the dimensions of the insertion assisting instrument 20 are set to satisfy a relationship of ya'<yb' in a state in which the insertion assisting instrument 20 is tilted such that the proximal-end-side tapered surface 30 is brought into contact with the wall surface.

The respective dimensions of the insertion assisting instrument 20 may also be set to satisfy at least either one of the first condition or the second condition.

First, the respective dimensions of the insertion assisting instrument 20 that satisfy the first and second conditions may be set such that, for example, the largest diameter D of the insertion assisting instrument 20 is 20 mm, the outer diameter d1 of the insertion assisting instrument 20 at the proximal end is 12 mm, the outer diameter d2 of the insertion assisting instrument 20 at the distal end is 10 mm, a length L1 of the assisting instrument body 21 in a direction of the center axis O is 16.5 mm, and a length L2 of the cap portion 50 in the direction of the center axis O is 8.4 mm.

The respective dimensions of the insertion assisting instrument 20 may also be set to satisfy at least either one of the above-mentioned two conditions.

Next, the description will be made with respect to behavior when the insertion portion 10, where the insertion assisting instrument 20 is mounted on the distal end portion 11, is inserted into the conduit 70.

When the flexible portion 13 is pushed into the conduit 70 from the outside of the conduit 70 by a user, the insertion portion 10 is inserted into the conduit 70.

Figure 18:
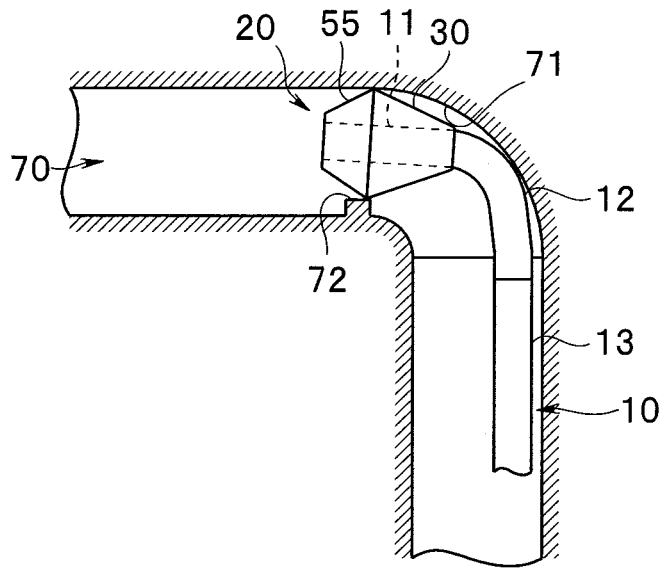
FIG. 18 is an explanatory diagram according to the first embodiment of the present invention, and shows a state of the insertion assisting instrument and an insertion portion at the time of passing through a curved portion of a conduit in a forward direction.

In a process of inserting the insertion portion 10, when the distal end portion 11 reaches a curved portion 71 of the conduit 70, for example, as shown in FIG. 18, the insertion portion 10 moves along a wall surface of the curved portion 71 which is disposed outward in a curve direction. At this point of operation, in a case where a stepped portion 72 is present at an intermediate portion of the conduit 70, the distal-end-side tapered surface 55 of the insertion assisting instrument 20 is brought into slide contact with the stepped portion 72 to guide the distal end portion 11 in a direction away from the stepped portion 72. With such guidance, the distal end portion 11 can pass over the stepped portion 72.

Figure 19:
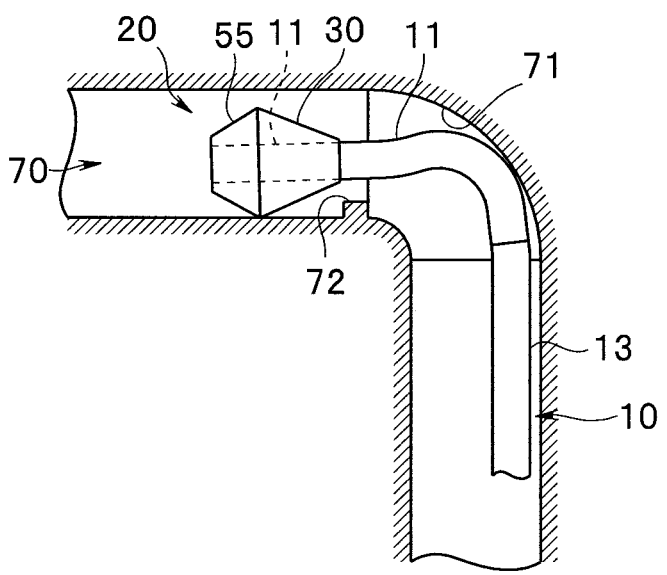
FIG. 19 is an explanatory diagram according to the first embodiment of the present invention, and shows the state of the insertion assisting instrument and the insertion portion after passing through the curved portion of the conduit in the forward direction.

Further, for example, as shown in FIG. 19, when the insertion portion 10 moves forward or backward in the conduit 70, a portion of the insertion assisting instrument 20 having the largest outer diameter is brought into contact with an inner wall of the conduit 70. Therefore, even in a case where the outer diameter of the distal end portion 11 is significantly smaller than an inner diameter of the conduit 70, the distal end portion 11 is moved to a position close to the center in the conduit 70. Accordingly, an excellent field of view of the image pickup unit 11a is ensured.

Next, the description will be made with respect to behavior when the insertion portion 10, where the insertion assisting instrument 20 is mounted on the distal end portion 11, is extracted from the inside of the conduit 70.

When the flexible portion 13 is pulled by a user from the outside of the conduit 70, the insertion portion 10 is extracted to the outside of the conduit 70.

Figure 20:
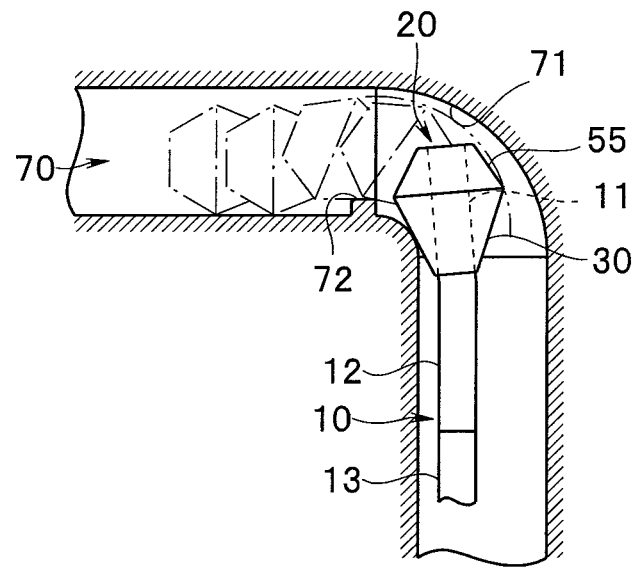
FIG. 20 is an explanatory diagram according to the first embodiment of the present invention, and shows the state of the insertion assisting instrument and the insertion portion at the time of passing through the curved portion of the conduit in a backward direction.

In a process of extracting the insertion portion 10, when the distal end portion 11 reaches the curved portion 71 of the conduit 70, for example, as shown in FIG. 20, the insertion portion 10 moves along the wall surface of the curved portion 71 which is disposed inward in the curve direction. At this point of operation, even in the case where the stepped portion 72 is present at the intermediate portion of the conduit 70, the proximal-end-side tapered surface 30 of the insertion assisting instrument 20 is brought into slide contact with the stepped portion 72 to guide the distal end portion 11 in a direction in which the distal end portion 11 is away from the stepped portion 72. With such guide, the distal end portion 11 can pass over the stepped portion 72.

In the process of extracting the distal end portion 11 as described above, the insertion portion 10 moves along the wall surface of the curved portion 71 which is disposed inward in the curve direction. Therefore, compared with a case of insertion of the distal end portion 11, there is a higher possibility of the insertion assisting instrument 20 being stuck at the curved portion 71.

In other words, in a case where a length of a taper on the proximal-end-side tapered surface 30 is not sufficient relative to the largest diameter of the insertion assisting instrument 20, the insertion assisting instrument 20 starts to turn before the proximal-end-side tapered surface 30 moves into the curved portion 71 and hence, the insertion assisting instrument 20 may be stuck at the curved portion 71.

Figure 21:
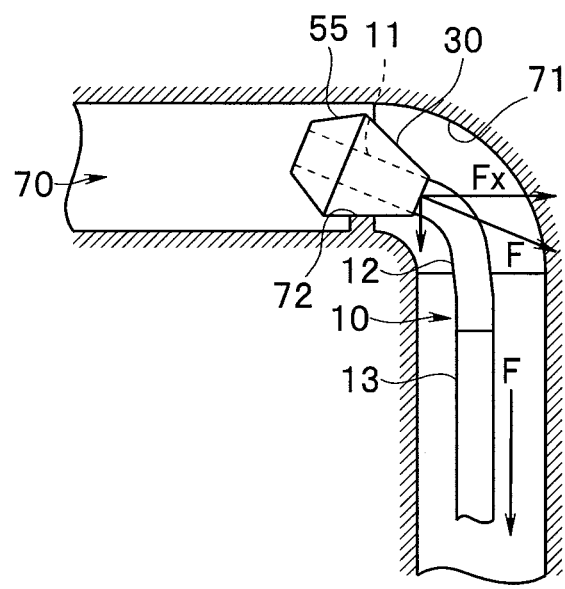
FIG. 21 is an explanatory diagram according to the first embodiment of the present invention, and shows component forces acting on the insertion assisting instrument before the insertion assisting instrument passes through the curved portion of the conduit in the backward direction.

In contrast, as shown in FIGS. 16 and 17, the respective dimensions of the insertion assisting instrument 20 of the present embodiment are set to have the relationship of xb'<xc' when the proximal-end-side tapered surface 30 is brought into contact with the wall surface. In other words, the insertion assisting instrument 20 is designed such that the length of the taper on the proximal-end-side tapered surface 30 is sufficient relative to the largest diameter. With such a design, at an initial stage of the insertion assisting instrument 20 entering a curved portion 72, for example, as shown in FIG. 21, most of a tractive force F transmitted from the flexible portion 13 is converted into component forces Fx directed outward in the curve direction of the curved portion 72. Due to such component forces Fx, the insertion assisting instrument 20 starts to turn after the insertion assisting instrument 20 largely moves into the curved portion 72. Accordingly, a large turning radius of the insertion assisting instrument 20 can be ensured in the curved portion 72 and hence, it is possible to effectively prevent the insertion assisting instrument 20 from being stuck in the curved portion 72.

Further, as shown in FIGS. 16 and 17, the respective dimensions of the insertion assisting instrument 20 of the present embodiment are set to have the relationship of ya'<yb' when the proximal-end-side tapered surface 30 is brought into contact with the wall surface. Accordingly, for example, as shown by chain lines in FIG. 20, when the insertion assisting instrument 20 enters the curved portion 72, a height of the insertion assisting instrument 20 as viewed from the wall surface, with which the proximal-end-side tapered surface 30 is brought into contact, is maintained at a value equal to or less than the largest diameter D of the insertion assisting instrument 20. With such a configuration, after the insertion assisting instrument 20 starts to turn at the curved portion 72, it is possible to avoid the distal end of the insertion assisting instrument 20 being brought into contact with the wall surface which is disposed outward in the curve direction in the conduit 70. Therefore, it is possible to effectively prevent the insertion assisting instrument 20 from being stuck.

Figure 22:
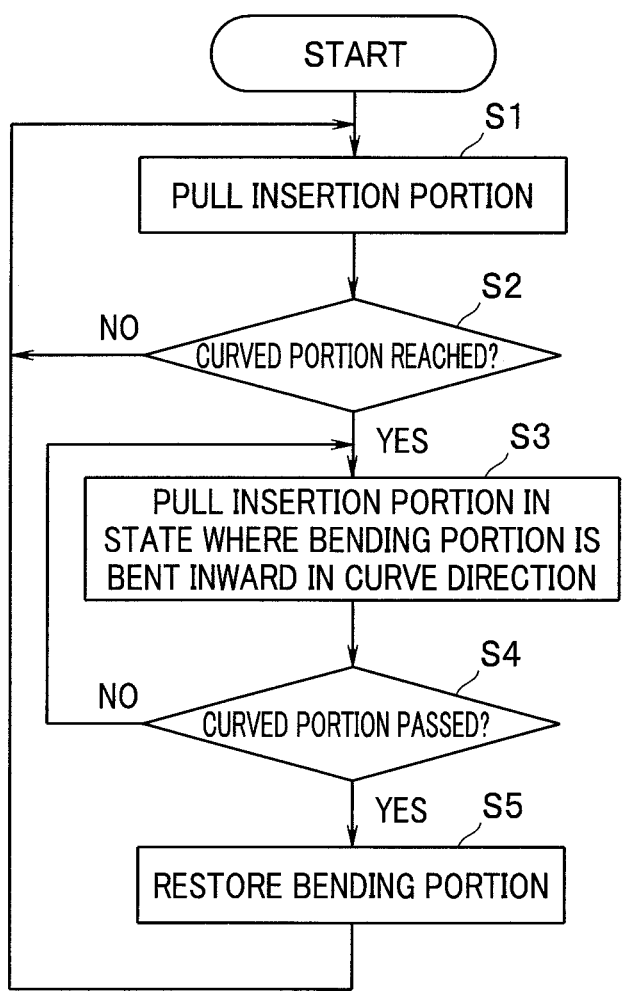
FIG. 22 is a flowchart according to the first embodiment of the present invention, and shows an extraction method of the insertion portion.

To more effectively prevent the insertion assisting instrument 20 from being stuck at the curved portion 72, for example, it is possible to adopt an extraction method of the insertion portion 10 of the endoscope 2 shown in FIG. 22.

Extraction of the insertion portion 10 is started by pulling the insertion portion 10 from the outside of the conduit 70 (step S1).

Such pulling is continued until it is determined that the distal end portion 11 (the insertion assisting instrument 20) has reached the curved portion 71 of the conduit 70 ("NO" in step S2).

In contrast, when it is determined that the distal end portion 11 has reached the curved portion 71 of the conduit 70 ("YES" in step S2), the bending portion 12 of the insertion portion 10 is bent inward in the curve direction of the curved portion 71, and the insertion portion 10 is pulled in a state in which the bending portion 12 is bent. In other words, a user operates the bending joystick 6a of the device body 3 while observing an endoscope image displayed on the display unit 15, for example, and pulls on the insertion portion 10 in a state in which the bending portion 12 is bent inward in the curve direction of the curved portion 71.

Whether the distal end portion 11 reaches the curved portion 71 can be determined based on whether conduit resistance at the time of the user pulling the insertion portion 10 reaches a value equal to or more than a predetermined value, for example.

Alternatively, whether the distal end portion 11 reaches the curved portion 71 can also be determined by the control unit 14 of the device body 3.

Figure 23:
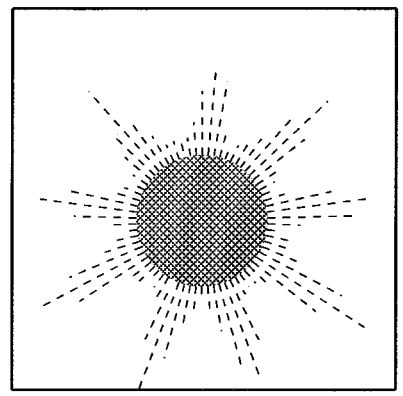
FIG. 23 is a schematic view according to the first embodiment of the present invention, and shows a picked-up image which is picked up when the insertion portion passes through a straight pipe portion of the conduit.
Figure 24:
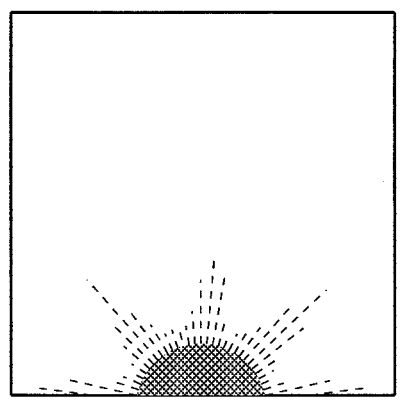
FIG. 24 is a schematic view according to the first embodiment of the present invention, and shows a picked-up image which is picked up before the insertion portion passes through the curved portion of the conduit in the backward direction.

In other words, when the distal end portion 11 is present at a straight pipe portion in the conduit 70, the center axis of the distal end portion 11 is substantially parallel to a center axis of the conduit 70. Accordingly, in an endoscope image which is picked up by the image pickup unit 11a, for example, as shown in FIG. 23, a dark portion to which no illumination light reaches is displayed at substantially the center on the image. In contrast, when the distal end portion 11 reaches the curved portion 71 in the conduit 70, the center axis of the distal end portion 11 is inclined with respect to a center axis of the straight pipe portion of the conduit 70. Accordingly, in an endoscope image which is picked up by the image pickup unit 11a, for example, as shown in FIG. 24, a dark portion is displayed at a position biased away from the center of the image. Alternatively, the dark portions is eliminated from the endoscope image which is picked up by the image pickup unit 11a.

The control unit 14 can determine whether the distal end portion 11 reaches the curved portion 71 in the conduit 70 by monitoring a state of these dark portions by image recognition. When the control unit 14 determines that the distal end portion 11 reaches the curved portion 71 in the conduit 70, the control unit 14 can notify a user of the fact via the display unit 15 or the like.

An operation in step S3 is continued until the distal end portion 11 passes through the curved portion 71 ("NO" in step S4).

When it is determined that the distal end portion 11 passes through the curved portion 71, the bending portion 12 is restored to an original state where the bending portion 12 is not bent (step S5) and, thereafter, the insertion portion 10 is pulled again (step S1). In other words, the user operates the bending joystick 6a of the device body 3 to cause the bending portion 12 to be restored to a non-bent state and, thereafter, the pulling of the insertion portion 10 is started again.

Whether the distal end portion 11 reaches the curved portion 71 can be determined based on whether conduit resistance at the time of the user pulling the insertion portion 10 reaches a value equal to or less than a predetermined value, for example.

Alternatively, whether the distal end portion 11 reaches the curved portion 71 can also be determined by the control unit 14 of the device body 3.

As described above, when the distal end portion 11 reaches the curved portion 71 of the conduit 70 in a process of extracting the insertion portion 10 from the conduit 70, the bending portion 12 is bent inward in the curve direction of the curved portion 71. With such an operation, it is possible to more effectively increase component forces Fx directed outward in the curve direction of the curved portion 72 for the distal end portion 11 (the insertion assisting instrument 20). Accordingly, it is possible to more effectively prevent the insertion assisting instrument 20 from being stuck at the curved portion 72.

The insertion assisting instrument 20 of the present embodiment has a configuration where the assisting instrument body 21 and the cap member 22 are coupled by fastening the male threaded portion 45 and the second female threaded portion 59 with each other. Therefore, there may be a case where, when inspection or the like of the inside of the conduit 70 is performed, fastening of the cap member 22 is loosened due to vibrations or the like caused by forward/backward movement of the insertion portion 10.

In such a case, even if the second female threaded portion 59 is removed from the male threaded portion 45, the first female threaded portion 58 engages with the male threaded portion 45 and hence, the cap member 22 is prevented from falling off the assisting instrument body 21.

Figure 26:
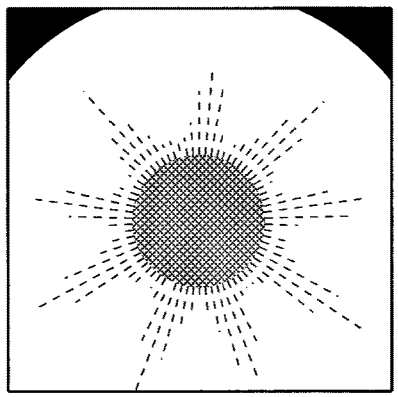
FIG. 26 is a schematic view according to the first embodiment of the present invention, and shows a picked-up image which is picked up in a state in which the fixing portion of the insertion assisting instrument is loosened.

Further, a configuration where the cap member 22 is removably mounted on the distal end side of the assisting instrument body 21 is adopted and hence, when the second female threaded portion 59 is removed from the male threaded portion 45, for example, as shown in FIG. 25, the cap member 22 obstructs a field of view of the image pickup unit 11a. In this case, for example, as shown in FIG. 26, the distal end portion holding hole 57 of the cap portion 50 is reflected in a picked-up image displayed on the display unit 15 (see dark portions at upper left and right portions in FIG. 26). Accordingly, the user can realize that the fastening of the cap member 22 is loose based on the picked-up image before the cap member 22 completely falls off.

According to such an embodiment, assuming that the insertion assisting instrument 20 is projected on the X-Y coordinates such that a point on a circumference where the insertion assisting instrument 20 has the largest outer diameter (that is, a point on the outer periphery of the proximal-end-side tapered surface 30 at the distal end) is set as the origin and the proximal-end-side tapered surface 30 is brought into contact with the X axis, the coordinates of the second point B, which is most distal from the X axis on the circumference where the insertion assisting instrument 20 has the largest outer diameter are (xb', yb'), and the coordinates of the third point C (a point which is brought into contact with the X axis), which is most proximal from the X axis on the circumference at the proximal end of the insertion assisting instrument 20, are (xc', yc'), outer diameter dimensions of the insertion assisting instrument 20 are set to satisfy the relationship of xb'<xc'. Accordingly, it is possible to effectively prevent the insertion assisting instrument 20 from being stuck at the curved portion 71 of the conduit 70 when the insertion portion 10, where the insertion assisting instrument 20 is mounted on the distal end portion 11, is extracted from the conduit 70.

In other words, the outer diameter dimensions of the insertion assisting instrument 20 are set to satisfy the relationship of xb'<xc' (more preferably, to satisfy the relationship of $15° \leq \theta 1 \leq 30°$ and hence, it is possible to ensure a sufficient length of the taper on the proximal-end-side tapered surface 30. Therefore, at the initial stage of the insertion assisting instrument 20 entering the curved portion 72, for example, as shown in FIG. 21, most of the tractive force F transmitted from the flexible portion 13 can be converted into the component forces Fx directed outward in the curve direction of the curved portion 72. Due to such component forces Fx, the insertion assisting instrument 20 starts to turn after the insertion assisting instrument 20 largely moves into the curved portion 72. Accordingly, a large turning radius of the insertion assisting instrument 20 can be ensured in the curved portion 72 and hence, it is possible to effectively prevent the insertion assisting instrument 20 from being stuck in the curved portion 72.

In addition, when the insertion assisting instrument 20 reaches the curved portion 71 of the conduit 70 at the time of extracting the insertion portion 10, where the insertion assisting instrument 20 is mounted on the distal end portion 11, from the conduit 70 or the like, the component forces of the tractive force Fx can be effectively increased by bending the bending portion 12 inward in the curve direction.

Further, assuming that the coordinates of the first point A, which is most distal from the X axis on the circumference at the distal end of the insertion assisting instrument 20 projected on the above-mentioned X-Y coordinates, are (xa', ya'), the outer diameter dimensions of the insertion assisting instrument 20 are set to satisfy the relationship of xb'<xc'. With such setting, when the insertion portion 10, where the insertion assisting instrument 20 is mounted on the distal end portion 11, is extracted from the conduit 70, it is possible to effectively prevent the insertion assisting instrument 20 from being stuck at the curved portion 71 of the conduit 70.

In other words, the outer diameter dimensions of the insertion assisting instrument 20 are set to satisfy the relationship of xb'<xc'. With such setting, for example, as shown by chain lines in FIG. 20, when the insertion assisting instrument 20 enters the curved portion 72, a height of the insertion assisting instrument 20 as viewed from the wall surface with which the proximal-end-side tapered surface 30 is brought into contact can be maintained at a value equal to or less than the largest diameter D of the insertion assisting instrument 20. Accordingly, after the insertion assisting instrument 20 starts to turn at the curved portion 72, it is possible to avoid the distal end of the insertion assisting instrument 20 being brought into contact with the wall surface which is disposed outward in the curve direction in the conduit 70. Therefore, it is possible to effectively prevent the insertion assisting instrument 20 from being stuck.

The insertion assisting instrument 20 of the present embodiment is formed of the assisting instrument body 21 and the cap member 22 such that the insertion assisting instrument 20 can be split. Accordingly, the distal-end-side tapered surface 55 can be formed by using a hard metal member, and the proximal-end-side tapered surface 30 can be formed by using a soft resin member. Therefore, at the time of inserting the insertion portion 10 into the conduit 70 or the like, the insertion assisting instrument 20 can move forward while pushing aside an obstacle in the conduit 70 with the distal-end-side tapered surface 30 which is made of metal. In contrast, even if the insertion assisting instrument 20 is stuck at the stepped portion 72 or the like of the conduit 70 at the time of extracting the insertion portion 10 from the conduit 70 or the like, by applying a large tractive force to the insertion portion 10, the proximal-end-side tapered surface 30 is shaved away by the wall surface or the like of the conduit 70 and hence, a movable state of the insertion assisting instrument 20 can be restored. In this case, by providing the chamfered portion 31 at the distal end of the proximal-end-side tapered surface 30 of the assisting instrument body 21, a portion of the insertion assisting instrument 20 having the largest diameter can be formed of a resin member. Accordingly, ease of extraction of the insertion assisting instrument 20 can be further increased.

Figure 27:
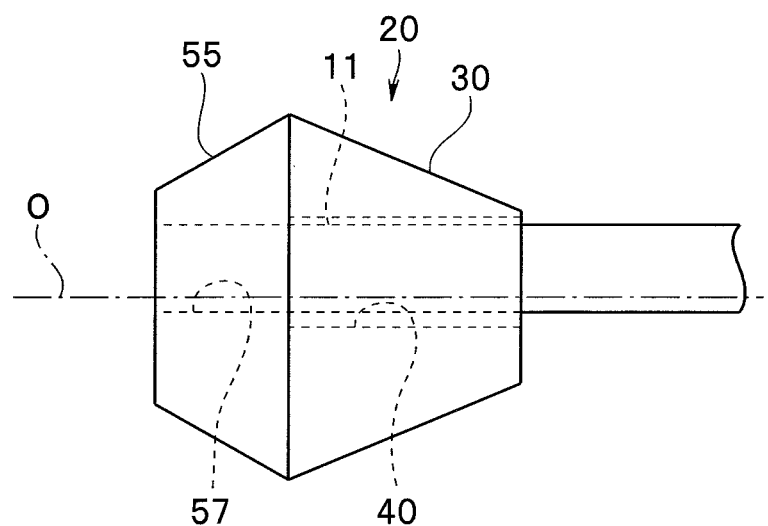
FIG. 27 is a side view according to a first modification, and schematically shows an insertion assisting instrument.

In the above-mentioned embodiment, for example, as shown in FIG. 27, a configuration may be adopted where the distal end portion 11 of the insertion portion 10 of the endoscope 2 is attached at a position which is eccentric with respect to the center axis O of the insertion assisting instrument 20.

In other words, in a modification shown in FIG. 27, the distal end portion insertion hole 40 and the distal end portion holding hole 57 are provided at positions biased away from the center axis O of the insertion assisting instrument 20.

With such a configuration, even in a case where the insertion assisting instrument 20 is stuck at the curved portion 71 or the like, the insertion assisting instrument 20 can be released from being stuck by rotating the insertion portion 10.

Figure 28:
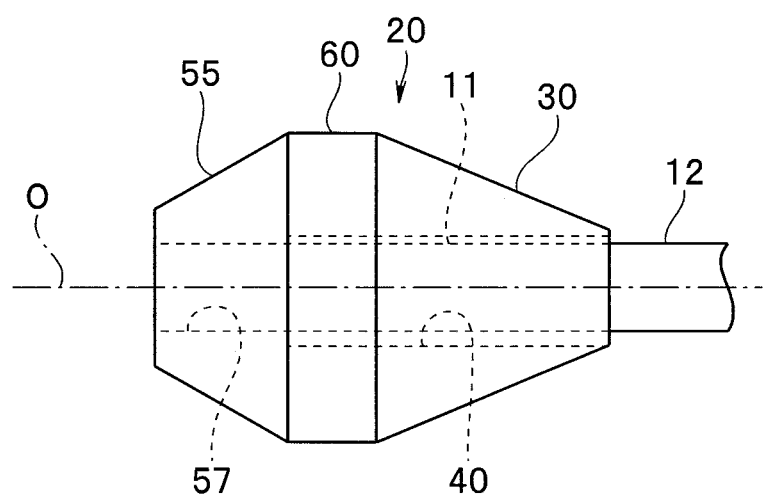
FIG. 28 is a side view according to a second modification, and schematically shows an insertion assisting instrument.

Further, for example, as shown in FIG. 28, a circumferential surface 60 with no incline may be interposed between the proximal-end-side tapered surface 30 and the distal-end-side tapered surface 55.

Next, a second embodiment of the present invention will be described based on FIG. 29 to FIG. 32. The present embodiment is obtained by adding requirements for the outer diameter dimensions of the insertion assisting instrument 20 to the above-mentioned first embodiment. Other components substantially equal to the corresponding components in the above-mentioned first embodiment are given the same reference symbols, and the description of such components will be omitted when appropriate.

Figure 29:
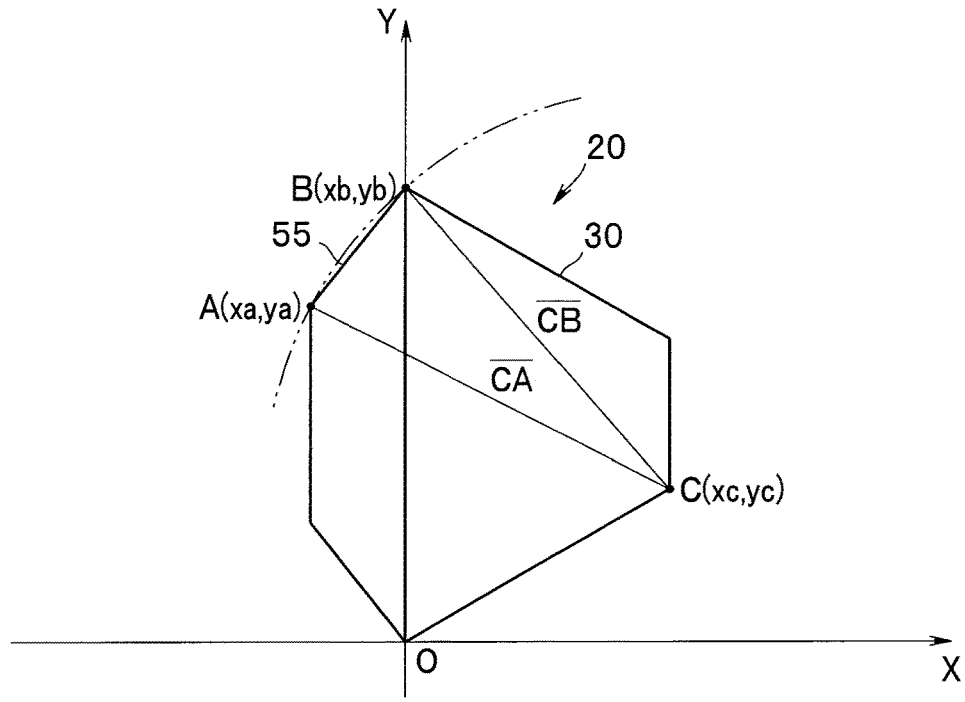
FIG. 29 is an explanatory diagram according to a second embodiment of the present invention, and shows a projection shape of an insertion assisting instrument on two-dimensional coordinates with a direction parallel to a center axis of the insertion assisting instrument being set as an X axis and with a direction perpendicular to the center axis of the insertion assisting instrument being set as a Y axis.
Figure 30:
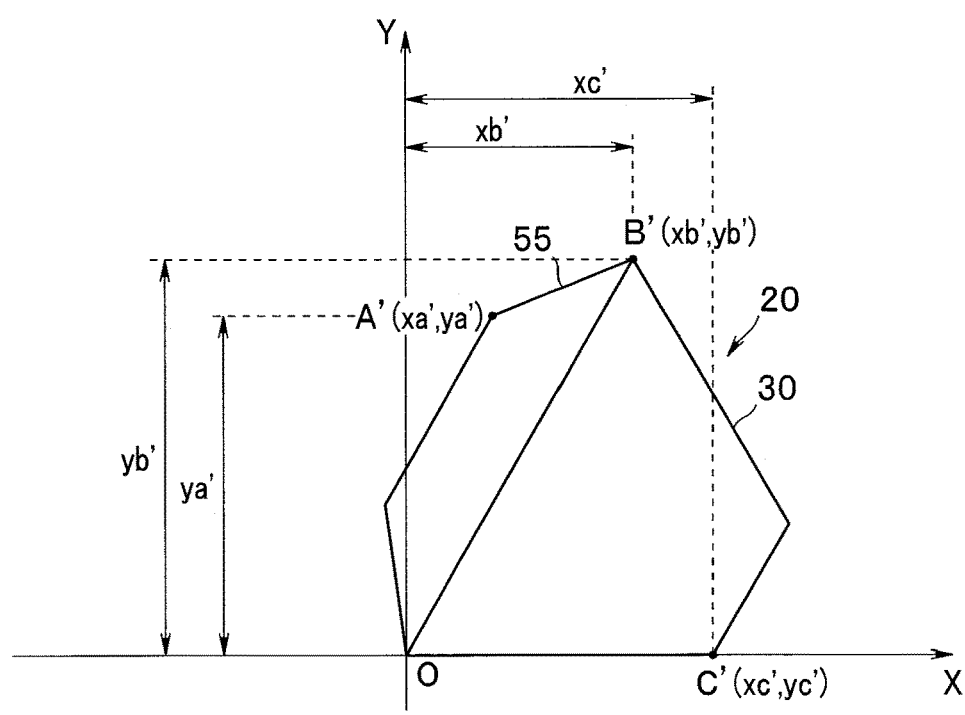
FIG. 30 is an explanatory diagram according to the second embodiment of the present invention, and shows a projection drawing of the insertion assisting instrument shown in FIG. 29 in a state of being rotated by a first taper angle.

In other words, in the same manner as the above-mentioned first embodiment (see FIGS. 16 and 17), in the case where the insertion assisting instrument 20 is projected on the X-Y coordinates, as shown in FIGS. 29 and 30, outer dimensions of the insertion assisting instrument 20 are set such that a distance from a third point C to a first point A is equal to or less than a distance from the third point C to a second point B. In other words, the outer dimensions of the insertion assisting instrument 20 of the present embodiment are set such that a distance CA from coordinates (xc, yc) to coordinates (xa, ya) is equal to or less than a distance CB from the coordinates (xc, yc) to coordinates (xb, yb). In other words, the outer dimensions of the insertion assisting instrument 20 are set such that the distance CA from coordinates (xc', yc') to coordinates (xa', ya') is equal to or less than the distance CB from the coordinates (xc', yc') to coordinates (xb', yb').

Figure 31:
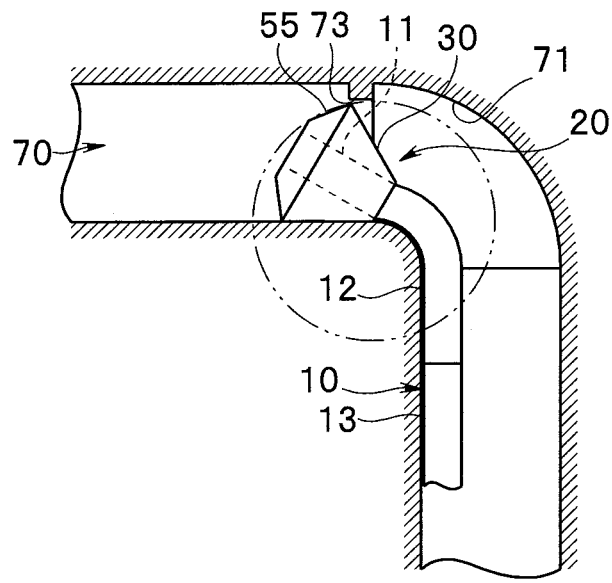
FIG. 31 is an explanatory diagram according to the second embodiment of the present invention, and shows a state of the insertion assisting instrument and an insertion portion before the insertion assisting instrument and the insertion portion pass through a curved portion of a conduit in a backward direction.
Figure 32:
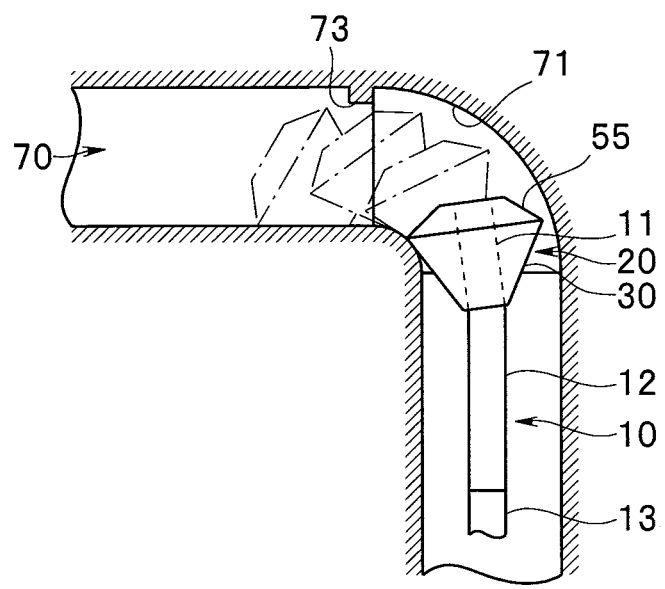
FIG. 32 is an explanatory diagram according to the second embodiment of the present invention, and shows behavior of the insertion assisting instrument when the insertion assisting instrument passes through the curved portion of the conduit in the backward direction.

With such a configuration, for example, also in a case as shown in FIGS. 31 and 32 where the insertion assisting instrument 20 turns by using a point on an outer periphery at a proximal end as a fulcrum at the curved portion 71 of the conduit 70 or the like, a turning trajectory of the distal end of the insertion assisting instrument 20 is caused to fall within a turning trajectory of a portion of the insertion assisting instrument 20 having the largest diameter. Accordingly, particularly, even in a case where a protrusion 73 or the like, which protrudes toward an inner side from an outer side in the curve direction, is present in a vicinity of the curved portion 71, it is possible to more effectively prevent the insertion assisting instrument 20 from being stuck at the curved portion 71 or the like.

The present invention is not limited to the above-described respective embodiments, and various modifications and changes are conceivable. Such modifications and changes also fall within the technical scope of the present invention. For example, needless to say, the configurations of the above-mentioned respective embodiments and the respective modifications may be suitably combined.

What is claimed is:

1. An insertion assisting instrument which has an outer peripheral surface including a proximal-end-side tapered surface with a diameter decreasing from a distal end side toward a proximal end side and a distal-end-side tapered surface with a diameter decreasing from a proximal end side toward a distal end side, the distal-end-side tapered surface being continuously provided on the distal end side of the proximal-end-side tapered surface, a distal end portion of an insertion portion of an endoscope being inserted through and fixed to the insertion assisting instrument, wherein
   assuming that the insertion assisting instrument is projected on X-Y coordinates such that a point on a circumference where the insertion assisting instrument has a largest outer diameter is set as an origin and the proximal-end-side tapered surface is brought into contact with an X axis, coordinates of a point which is most distal from the X axis on the circumference where the insertion assisting instrument has the largest outer diameter are (xb', yb'), and coordinates of a point which is most proximal from the X axis on a circumference at a proximal end of the insertion assisting instrument are (xc', yc'), the insertion assisting instrument has an outer dimension that satisfies a relationship of xb'<xc'.

2. The insertion assisting instrument according to claim 1, wherein
   assuming that coordinates of a point which is most distal from the X axis on a circumference at a distal end of the insertion assisting instrument projected on the X-Y coordinates are (xa', ya'), the insertion assisting instrument further has an outer dimension that satisfies a relationship of ya'<yb'.

3. The insertion assisting instrument according to claim 1, wherein
   assuming that coordinates of a point which is most distal from the X axis on a circumference at a distal end of the insertion assisting instrument projected on the X-Y coordinates are (xa', ya'), the insertion assisting instrument further has an outer dimension that satisfies a relationship that a distance between the coordinates (xc', yc') and the coordinates (xa', ya') is equal to or less than a distance between the coordinates (xc', yc') and the coordinates (xb', yb').

4. The insertion assisting instrument according to claim 1, comprising:
   an assisting instrument body including an outer cylinder member which has the proximal-end-side tapered surface and which has a truncated cone shape; and
   a cap member including a cap portion and coupled to a distal end side of the assisting instrument body, the cap portion having the distal-end-side tapered surface and having a truncated cone shape.

5. The insertion assisting instrument according to claim 4, wherein
   the outer cylinder member is made of resin, and
   the cap portion is made of metal.

6. The insertion assisting instrument according to claim 4, comprising:
   an inner cylinder member provided in the outer cylinder member;
   a male threaded portion provided on an outer periphery of the inner cylinder member;
   a cylinder portion continuously provided on a proximal end side of the cap portion;
   a first female threaded portion provided on an inner periphery of the cylinder portion at a position close to a proximal end side, the first female threaded portion being capable of being threadedly engaged with the male threaded portion; and
   a second female threaded portion provided on the inner periphery of the cylinder portion at a position close to a distal end side, the second female threaded portion being capable of being threadedly engaged with the male threaded portion, wherein
   the cap member is coupled to the assisting instrument body by thread engagement between the second female threaded portion and the male threaded portion.

7. An insertion assisting instrument which has an outer peripheral surface including a proximal-end-side tapered surface with a diameter decreasing from a distal end side toward a proximal end side and a distal-end-side tapered surface with a diameter decreasing from a proximal end side toward a distal end side, the distal-end-side tapered surface being continuously provided on the distal end side of the proximal-end-side tapered surface, a distal end portion of an insertion portion of an endoscope being inserted through and fixed to the insertion assisting instrument, wherein
   assuming that the insertion assisting instrument is projected on X-Y coordinates such that a point on a circumference where the insertion assisting instrument has a largest outer diameter is set as an origin and the proximal-end-side tapered surface is brought into contact with an X axis, coordinates of a point which is most distal from the X axis on a circumference at a distal end of the insertion assisting instrument are (xa', ya'), and coordinates of a point which is most distal from the X axis on the circumference where the insertion assisting instrument has the largest outer diameter are (xb', yb'), the insertion assisting instrument has an outer dimension that satisfies a relationship of ya'<yb'.

8. The insertion assisting instrument according to claim 7, wherein
   assuming that coordinates of a point which is most proximal from the X axis on a circumference at a proximal end of the insertion assisting instrument projected on the X-Y coordinates are (xc', yc'), the insertion assisting instrument further has an outer dimension that satisfies a relationship of $xb' < xc'$.

9. The insertion assisting instrument according to claim 7, wherein assuming that coordinates of a point which is most proximal from the X axis on a circumference at a proximal end of the distal end of the insertion assisting instrument projected on the X-Y coordinates are ($xc'$, $yc'$), the insertion assisting instrument further has an outer dimension that satisfies a relationship that a distance between the coordinates ($xc'$, $yc'$) and the coordinates ($xa'$, $ya'$) is equal to or less than a distance between the coordinates ($xc'$, $yc'$) and the coordinates ($xb'$, $yb'$).

10. The insertion assisting instrument according to claim 1, wherein the insertion assisting instrument is attached to the distal end portion of the endoscope, the insertion portion of the endoscope including the distal end portion and a bending portion.

11. An extraction method of an insertion portion of an endoscope from an inside of a conduit, an outer peripheral surface of the insertion portion of the endoscope being provided with the insertion assisting instrument according to claim 1, the insertion portion including a distal end portion, a bending portion, and a flexible portion, the distal end portion of the insertion portion being inserted through and fixed to the insertion assisting instrument, the method comprising:

pulling the flexible portion from an outside of the conduit; and causing the bending portion to be bent inward in a curve direction of a curved portion in a case where the distal end portion reaches the curved portion of the conduit.

* * * * *